United States Patent
Dickinson et al.

(10) Patent No.: US 10,862,709 B1
(45) Date of Patent: Dec. 8, 2020

(54) CONDITIONAL FLOW POLICY RULES FOR PACKET FLOWS IN PROVIDER NETWORK ENVIRONMENTS

(71) Applicant: Amazon Technologies, Inc., Seattle, WA (US)

(72) Inventors: Andrew Bruce Dickinson, Seattle, WA (US); Kevin Christopher Miller, Bainbridge Island, WA (US); Eric Wayne Schultze, Pellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 15/409,487

(22) Filed: Jan. 18, 2017

(51) Int. Cl.
  *H04L 12/66* (2006.01)
  *H04L 12/46* (2006.01)
  *H04L 12/721* (2013.01)

(52) U.S. Cl.
  CPC .......... *H04L 12/66* (2013.01); *H04L 12/4641* (2013.01); *H04L 45/38* (2013.01)

(58) Field of Classification Search
  CPC ........ H04L 45/38; H04L 45/64; H04L 63/02; H04L 63/1408; H04L 2212/00
  See application file for complete search history.

(56) References Cited

U.S. PATENT DOCUMENTS

| | | | |
|---|---|---|---|
| 5,825,772 A | 10/1998 | Dobbins et al. | |
| 6,711,152 B1 | 3/2004 | Kalmanek, Jr. et al. | |
| 7,272,643 B1 | 9/2007 | Sarkar et al. | |
| 7,478,167 B2 | 1/2009 | Ould-Brahim et al. | |
| 8,644,188 B1 | 2/2014 | Brandwine et al. | |
| 8,660,129 B1 | 2/2014 | Brendel et al. | |
| 10,075,377 B1* | 9/2018 | Sharma | H04L 43/062 |
| 2006/0251088 A1 | 11/2006 | Thubert et al. | |
| 2009/0046726 A1 | 2/2009 | Cabrera et al. | |
| 2010/0246443 A1* | 9/2010 | Cohn | H04L 12/4641 370/255 |
| 2015/0003453 A1 | 1/2015 | Sengupta et al. | |
| 2015/0244617 A1 | 8/2015 | Nakil et al. | |
| 2016/0218918 A1* | 7/2016 | Chu | H04L 41/5054 |
| 2016/0226766 A1* | 8/2016 | Al-Zoubi | H04L 45/64 |
| 2017/0346892 A1* | 11/2017 | Bian | H04L 67/1076 |
| 2018/0062962 A1* | 3/2018 | Pignataro | H04L 43/0829 |

FOREIGN PATENT DOCUMENTS

EP 1298853 4/2003

OTHER PUBLICATIONS

Yu, Minlan, et al. "Scalable flow-based networking with DIFANE." ACM SIGCOMM Computer Communication Review 41.4, 2011, pp. 351-362.
U.S. Appl. No. 15/409,485, filed Jan. 18, 2017, Andrew Bruce Dickinson.

* cited by examiner

*Primary Examiner* — Brian P Cox
(74) *Attorney, Agent, or Firm* — Robert C. Kowert; Kowert, Hood, Munyon, Rankin & Goetzel, P.C.

(57) ABSTRACT

A flow policy service that allows clients to define policies for packet flows to, from, and within their virtual networks on a provider network. Logic may be embedded in a flow policy that dictates what happens to a packet as it enters the network, or after the packet leaves an appliance. Via the service, a client may define conditional rules that specify different paths that packets should follow on the provider network according to conditional evaluations of information about the packets, for example source and/or destination endpoints of the packets, or output codes from appliances that process the packets.

20 Claims, 19 Drawing Sheets

CONDITIONAL FLOW POLICY RULES FOR PACKET FLOWS IN PROVIDER NETWORK ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Figure 1A:
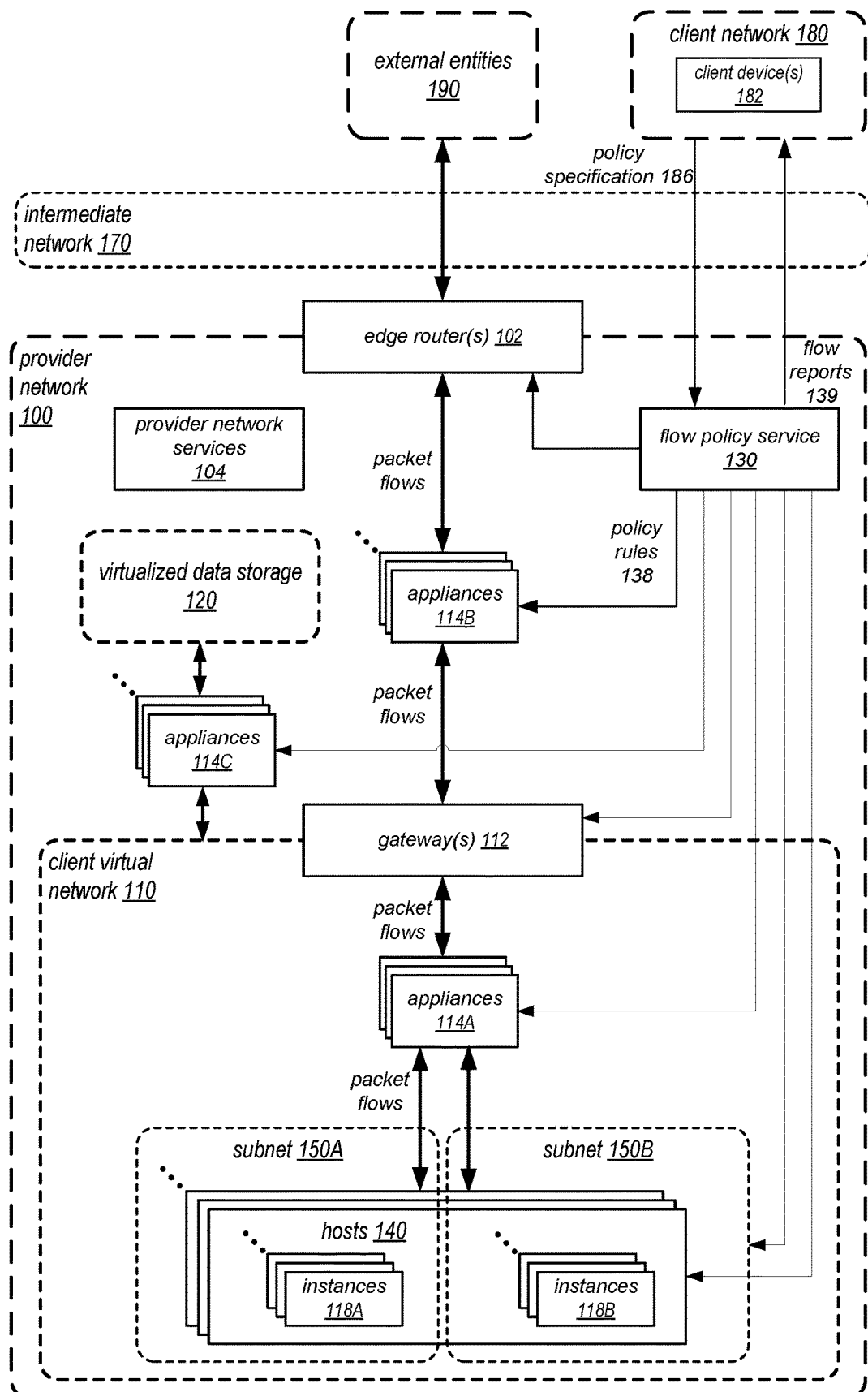
FIG. 1A illustrates a flow policy service in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing flow policies for virtual networks in provider network environments are described. Embodiments of a flow policy service are described that allow clients to define flow policies for their network traffic (e.g., packet flows) to, from, and within their virtual networks on a provider network. Via the flow policy service, a client may define flow policies that include rules that specify the network appliances that inbound, outbound, and/or internal virtual network traffic should flow through and be processed by. Flow policy rules may, for example, be defined for and attached to the virtual network, to subnets within the virtual network, and/or to the client's resource instances within the virtual network implemented as virtual machines on host devices. In some embodiments, the flow policy rules may be specified in a descriptive domain-specific language. In other embodiments, flow policy rules may be specified in flow tables.

A flow policy rule may indicate a sequence of one or more network appliances that should process a client's packets (e.g., TCP or UDP packets) on packet flows between source and destination endpoints based on information about the packets, including but not limited to information in the packet headers, as specified in the rule. For example, a flow policy rule may indicate a sequence of one or more network appliances through which packet flows from a specified source address or address range to a specified destination address or address range should pass. As another example, a flow policy rule may indicate a sequence of one or more network appliances through which packet flows of a particular network protocol (e.g., TCP or UDP) should pass. As another example, a flow policy rule may indicate a sequence of one or more network appliances through which packet flows to or from a particular port on a particular virtual machine should pass.

Network appliances, as used herein, may include any physical device or virtual machine (VM) that performs some function on a client's packets (e.g., TCP or UDP packets) in packet flows between source and destination endpoints. Example network appliances may include, but are not limited to, firewalls, intrusion detection systems, virus scanning systems, traffic analysis systems, load balancers, network accelerators, encryption systems, and packet filtering systems. Network appliances may be implemented as physical devices on the provider network or as virtual machines implemented on host devices on the provider network. Network appliances may be provided by the service provider, by third parties, or by the client. Network appliances may be included in a virtual network to process traffic within the virtual network, or may be attached to the virtual network to process traffic to or from the virtual network. In embodiments, a client may specify a set of network appliances to add or attach to their virtual network, and via the flow policy service may specify rules that define what traffic should flow through an appliance, or through a set of appliances. For example, a flow policy rule may state that all traffic directed from the virtual network to an external network (e.g., the Internet) should flow through appliance A and then through appliance B. As another example, a policy rule may state that all traffic to or from a specified instance in the virtual network should first go through an appliance C.

Figure 13:
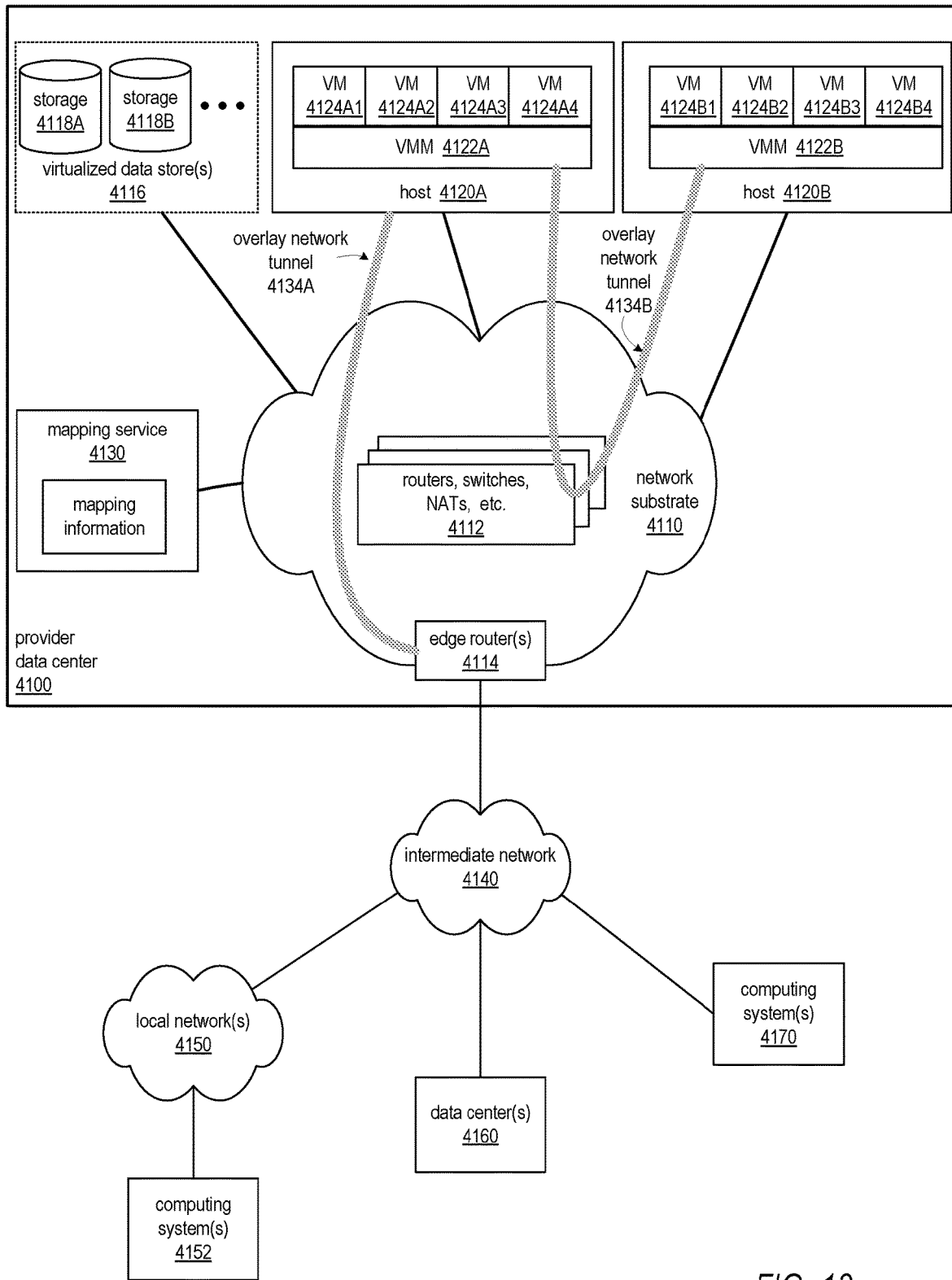
FIG. 13 illustrates an example data center that implements an overlay network on a network substrate using IP tunneling technology, according to some embodiments.

In at least some embodiments, the flow policy for a client's virtual network as defined through the flow policy service may be applied by a network control plane of the provider network. As illustrated in FIG. 13, a data center that implements the provider network may include a network substrate that includes virtual or physical networking devices such as routers, switches, and network address translators (NATs), as well as host devices that implement virtual machines (VMs) according to hardware virtualization technology, physical connections between devices on the network, and so on. The provider network may include an overlay network implemented on the network substrate. Components of the network substrate that control traffic on the overlay network may be collectively referred to as the network control plane. The overlay network may, for example, be implemented according to a technology via which client packets of a network protocol (e.g., TCP or UDP packets) from source endpoints are encapsulated by the network control plane with overlay network metadata, routed through the network substrate by the network control plane to destinations on the network substrate according to the overlay network metadata, decapsulated by the network control plane, and delivered to destination endpoints. The flow policy service may implement the client's specified flow policy for their virtual network on the provider network by configuring one or more components in the network control plane with appropriate flow policy rules. The network control plane may then apply the flow policy rules to packet flows to, from, or within the client's virtual network to route client packets in the packet flows through network appliances as specified by the flow policy rules.

In some embodiments, logic may be embedded in a flow policy that dictates what happens to traffic after it leaves a network appliance. The embedded logic may, for example, allow the conditional routing of a client's packets on the network based on evaluation of information about the packets (e.g., information in the packet headers), information generated by packet processing functionality of the network appliances, and/or other information such as metrics related to resource usage in the virtual network. As an example, in some embodiments, a virtual or physical device in the network control plane may receive client packets on packet flows between endpoints. Flow policy functionality (referred to as a flow policy engine, or simply policy engine) on the device may evaluate the client packets according to flow policy rules based on information in the packet headers (e.g., source and/or destination addresses, port numbers, etc.), and make decisions according to the evaluation as to which appliances the client packets should go to before being delivered to a destination endpoint on the client's virtual network or to an endpoint external to the client's virtual network. For example, a flow policy rule may indicate that all incoming client packets for a client's virtual network that are within a source address range A are to go to appliance A, and all incoming client packets for the client's virtual network within a source address range B are to go to an appliance B. As another example, a flow policy rule may indicate that all incoming client packets for a client's virtual network that are of a protocol A are to go to appliance A, and all incoming client packets for the client's virtual network are of a protocol B are to go to an appliance B. As another example, in some embodiments, a network appliance may receive and process traffic (client packets on packet flows between endpoints), and may output codes based on the processing; the output codes may, for example, be captured and added to metadata (e.g., in packet headers) for the packets. A flow policy engine implemented by a virtual or physical device in the network control plane may determine where to send the packets based on the output codes. For example, a flow policy rule may indicate that all outgoing client packets from a client's virtual network are to first go to appliance A; on egress from appliance A, if an output code from appliance A is a particular value, send the traffic to an appliance B for further processing; otherwise, send the traffic to an Internet gateway for delivery to a destination endpoint.

In some embodiments, the network appliances attached to or within a client's virtual network may generate flow logs based on the traffic processed at the network appliances. In some embodiments, network devices (e.g., edge routers, host devices that implement virtual machines, devices that implement network appliances, etc.) that apply flow policy rules may also generate flow logs. The flow logs may, for example, be collected and aggregated by the flow policy service to generate flow reports that may indicate sequences of the network appliances through which packet flows to, from, or within the client's virtual network have passed, and that may be used by the client to confirm that traffic to, from, or within their virtual network is flowing through the correct network appliances according to the client's flow policy.

Embodiments of the flow policy service allow clients to specify the paths that packets should follow through network appliances between endpoints within their virtual network and between endpoints within their virtual network and external endpoints at the flow level, and flow policy rules may be established on the provider network to implement the paths. A client may, for example, specify paths through particular network appliances for packet flows to or from particular ports on their VMs in the virtual network. For example, a flow policy rule may be defined that specifies that packets on a packet flow from port A on instance A should first go to appliance A, then to appliance B, and then to the destination endpoint. Another flow policy rule may be defined that specifies that packets on a packet flow to port B on instance A should first go to appliance C, then to appliance D, and then to port B. Conventional methods for controlling network traffic, for example conventional route tables, are applied locally (e.g., on a network device), and do not provide the flexibility to allow the client to easily specify the complete paths that packets should follow over the network through network appliances between endpoints at the flow level.

FIG. 1A illustrates a flow policy service in a provider network environment, according to some embodiments. In at least some embodiments of a provider network 100, at least some of the resources provided to clients of a service provider via the provider network 100 may be virtualized computing resources (also referred to as virtual machines) implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, a client of the service provider (represented in FIG. 1A by client network 180), via external client device(s) 182 coupled to the provider network 100 via an intermediate network 170 such as the Internet, may access one or more services 104 of the provider network via APIs to the services 104 to obtain and configure resource instances, including but not limited to computation resources and storage resources.

Figure 1B:
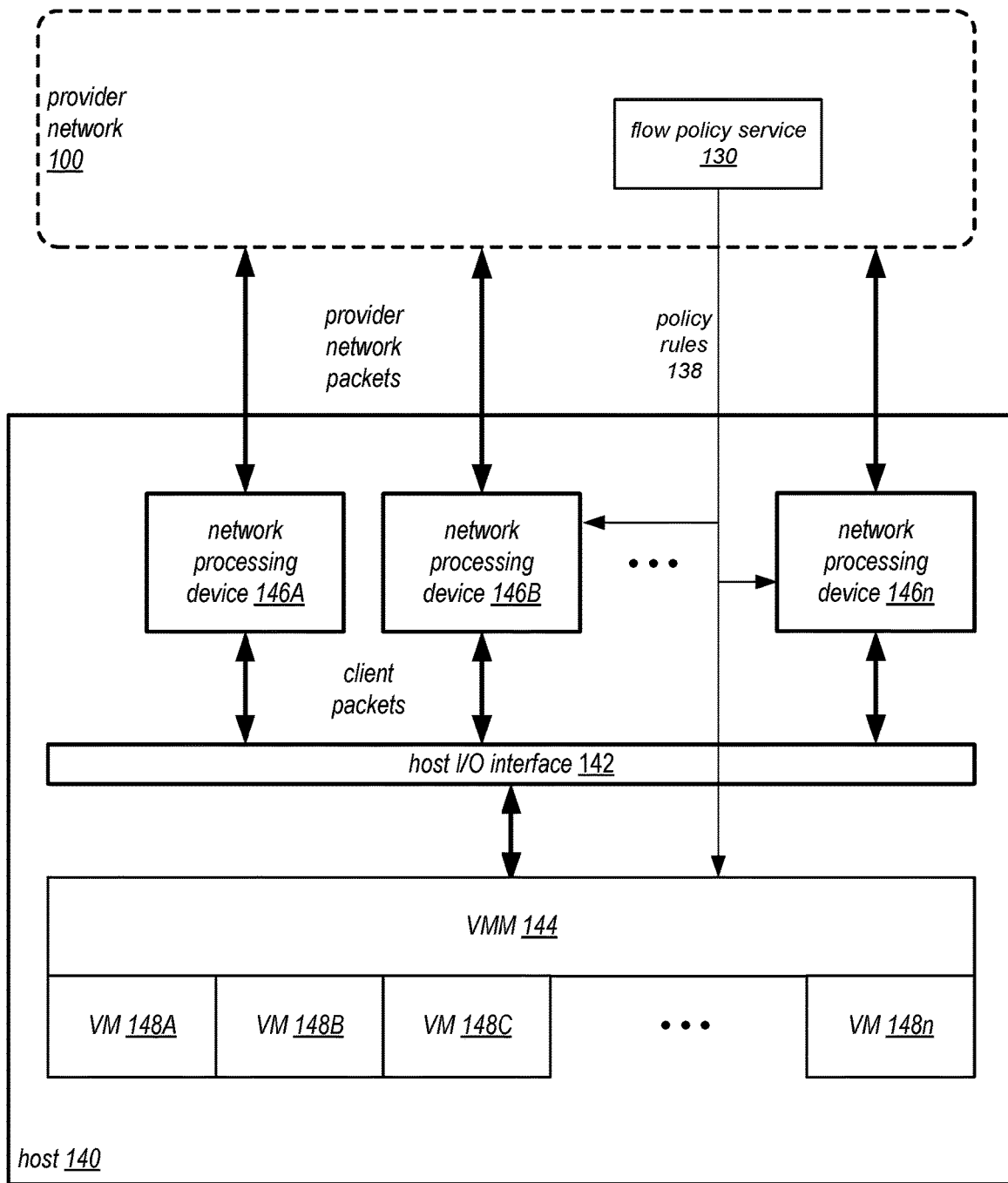
FIG. 1B illustrates flow policy rules applied at components of a host device for virtual machines in a provider network environment, according to some embodiments.

A service provider that provides a provider network 100 for clients may provide services and application programming interfaces (APIs) that allow clients to establish and manage resources in virtual networks 110 on the provider network 100. A virtual network 110 in a provider network 100 environment may be broadly defined as a network space (e.g., logically defined by an address range or address space) that contains a set of provider network resources of a respective client, and that acts as a logically isolated section on the provider network 100 for the client's resources. A virtual network 110 may implement a private or local Internet Protocol (IP) address space according to a network protocol, for example 32-bit IP addresses within an Internet Protocol version 4 (IPv4) address range or subnet. A client's virtual network 110 on the provider network 100 includes the client's resource instances 118, such as virtual machines (VMs) on host devices 140 configured as virtual computing resource instances by the client. The client's resource instances 118 on the virtual network 110 may be assigned IP addresses (e.g., 32-bit IPv4 addresses) within the virtual network 110's address space. At least some of the resource instances 118 on a provider network may be implemented according to hardware virtualization technology that enables multiple operating systems to run concurrently on a host computer, i.e. as VMs on a host 140. A hypervisor, or virtual machine monitor (VMM), on a host 140 presents the VMs on the respective host 140 with a virtual platform and monitors the execution of the VMs on the host 140. Each VM may be provided with one or more IP addresses; the VMM on a respective host 140 may be aware of the IP addresses of the VMs on the host 140. FIG. 1B illustrates an example host 140, according to some embodiments.

Various networking resources, structures, and functionalities (referred to as networking primitives) may be provided to clients of the provider network 100 via the various provider network services 104. Clients may create, configure, populate, and modify their virtual network 110 implementations on the provider network 100 at least in part using the various services 104. The following lists example networking primitives that may be provided by the services 104, and is not intended to be limiting:

Virtual networks.
Resource instances (e.g., VMs implemented by host devices on the provider network and configured as virtual computing resource instances by the client using the services 104).
Tags—In some embodiments, a client may be allowed to assign particular roles to particular resource instances within their virtual network by tagging the resource instances. The tags may be stored in metadata for the resource instances. The tags may include standard provider network-defined tags and/or client-defined tags.
Virtual network endpoints (e.g., endpoints such as computation resources, storage resources, servers, etc.).
Virtual network peering connections. In some embodiments, a client may establish two or more virtual networks in a virtual network implementation on a provider network. A peering connection may be established between virtual networks that allows the virtual networks to securely communicate over the provider network without having to traverse an external network such as the Internet.
Internet gateways that provide access to at least some of a virtual network's resources from entities external to the virtual network.
Load balancers, for example virtualized load balancer instances that distribute network traffic among a group or cluster of resource instances on a virtual network.
Network Address Translation (NAT) instances.
NAT gateways.
Network Access Control Lists (ACLs).
Network interfaces.
Route tables.
Subnets—A virtual network may be, but is not necessarily, subdivided into two or more subnetworks, or subnets.
Security groups—In some embodiments, the provider network may allow a client to establish and manage virtual security groups within the client's virtual network, within or across subnets. A security group is a logical grouping of resource instances and acts as a virtual firewall that controls the traffic allowed to reach one or more resource instances within the security group according to security group rules.
Regions—Provider network services and resources (e.g., virtual networks, VM instances, data storage, gateways, load balancers, etc.) may be supported in multiple geographic locations or areas. As used herein, a region is a separate geographic area that supports the provider network services and in which a client may launch and configure resources. The services and APIs may allow clients to launch or replicate their resources in one or more regions.
Zones—Each region may include multiple, isolated locations, referred to herein as zones. A client's resource instances may be distributed across multiple zones within a region so that, if a resource instance in one zone fails, an instance in another zone can handle requests.

In some embodiments, clients may establish virtual networks 110 on the provider network 100 that include instances of one or more of the above networking primitives using respective provider network services 104. FIG. 1A illustrates an example virtual network 110 on a provider network 100, and is not intended to be limiting. A client's virtual network 110 may include VM instances 118 implemented by hosts 140 that implement the functionality of the client's virtual network, for example application servers, web servers, database servers, and so on. The resources instances 118 may include groups or clusters of instances 118A and 118B; for example, instances 118A may represent a production environment, while instances 118B may represent a development environment. In some embodiments, instances 118A and 118B may be in different subnets 150A and 150B and/or security groups.

A client's virtual network 110 may include one or more gateways 112 that enable devices 182 on the client network 180 and other external entities 190 to communicate with resources and endpoints within virtual network 110 via an intermediate network 170 such as the Internet. Gateways 112 may, for example, include Internet gateways and NAT gateways, and may support access to resources including VM instances 118 on virtual network 110 via Secure Socket Shell (SSH), HTTPS, or other network protocols. In some embodiments, gateways 112 may be implemented as virtual gateways on host devices on the provider network.

Figure 2:
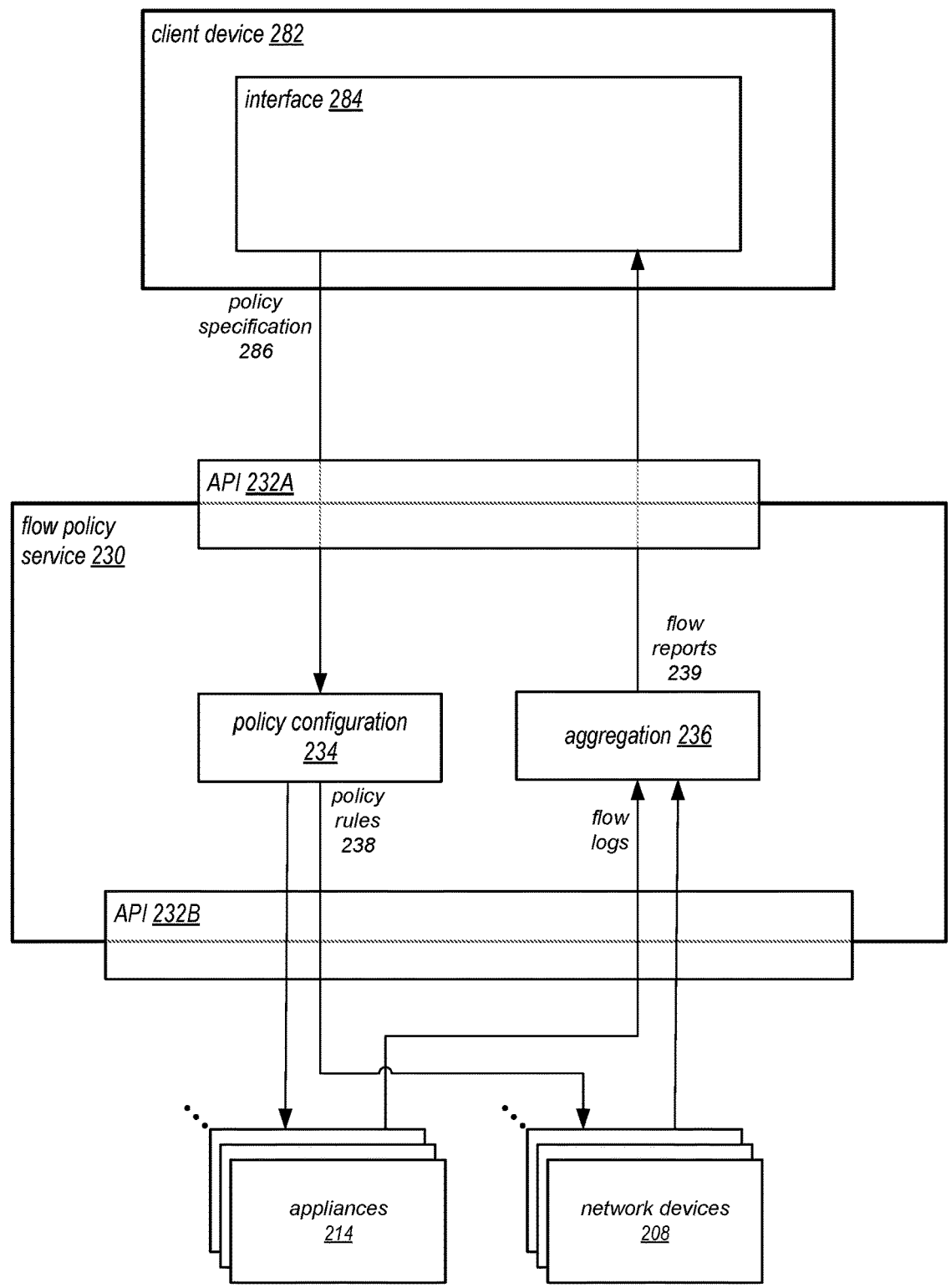
FIG. 2 illustrates components and operation of an example flow policy service, according to some embodiments.

As shown in FIG. 1A, the provider network 100 may include a flow policy service 130 implemented by one or more computing devices on the provider network 100. The flow policy service 130 allows the client to define flow policy for network traffic to, from, and within their virtual network 110 on the provider network 100. Via the flow policy service 130, the client may specify flow policy; from the specified policy, the flow policy service 130 generates policy rules 138 that specify the network appliances 114 that inbound, outbound, and/or internal virtual network traffic should flow through. Flow policy for inbound and/or outbound network traffic may, for example, be specified for and attached to the virtual network 110, to subnets 150 or security groups within the virtual network 110, to particular ones of the client's resource instances 118 within the virtual network 110 implemented as virtual machines on hosts 140 of the provider network 100, and/or to particular endpoints (e.g., particular ports on instances 118) on the virtual network 110. In some embodiments, the flow policy rules may be specified in a descriptive domain-specific language. A non-limiting example of such a policy rule may be something like "FPS rule: <Instance A> outbound: <Appliance A> <Appliance B> <Gateway>" that specifies that outbound traffic from instance A should flow through appliance A, and then through appliance B, and then to a gateway, where FPS is the flow policy service. In some embodiments, the flow policy rules may be specified by the client in human-friendly ways. A non-limiting example of such a policy rule may be something like "All traffic from instance A should flow through appliance A and then appliance B before exiting through a gateway to the Internet." The flow policy service may parse these human-friendly rules to generate rules in the domain-specific language. FIG. 2 further illustrates a flow policy service 130, according to some embodiments. Example flow policy rules are provided later in this document.

Referring to FIG. 1A, the client specifies a flow policy for a virtual network 110 via the flow policy service 130. The flow policy service 130 determines how and where on the provider network 100 to implement flow policy rules 138 in order to apply the specified policy on the provider network 100. Thus, the actual implementation of the flow policy for the client's virtual network 110 on the provider network 100 may be hidden from the client. In some embodiments, if an appliance 114 specified by the client in a policy is a virtual appliance, the appliance 114 may be instantiated by the flow policy service 130 for the client if necessary, for example by directing an appropriate provider network service 104 to generate an instance of the appliance 114 on a host device of the provider network 100. In some embodiments, if an appliance 114 specified by the client in a policy is a physical network appliance, the appliance 114 may be configured by the flow policy service 130 for the client if necessary, for example by directing an appropriate provider network service 104 to configure the appliance 114.

As shown in FIG. 1A, in various embodiments, flow policy rules 138 may be implemented by the flow policy service 130 at various virtual or physical devices within the provider network 100 infrastructure. The flow policy rules 138 may be formatted according to a domain-specific language. In embodiments where the client enters the flow policy according to a human-friendly language, the flow policy service 130 may parse the client's entries to generate the rules 138 according to the domain-specific language. In some embodiments, each virtual or physical device at which rules 138 are implemented may include a flow policy engine, i.e. a software program for executing flow policy rules 138 according to the domain-specific language at the device. For example, flow policy rules 138 for inbound traffic from an intermediate network 170 such as the Internet may be implemented at one or more edge routers 102 of the provider network 100 and applied by flow policy engines on the edge routers 102. As another example, flow policy rules 138 for inbound and outbound traffic from virtual network 110 may be implemented at one or more virtual gateways 112 of the virtual network 110 and applied by flow policy engines at the virtual gateways 112.

Figure 16:
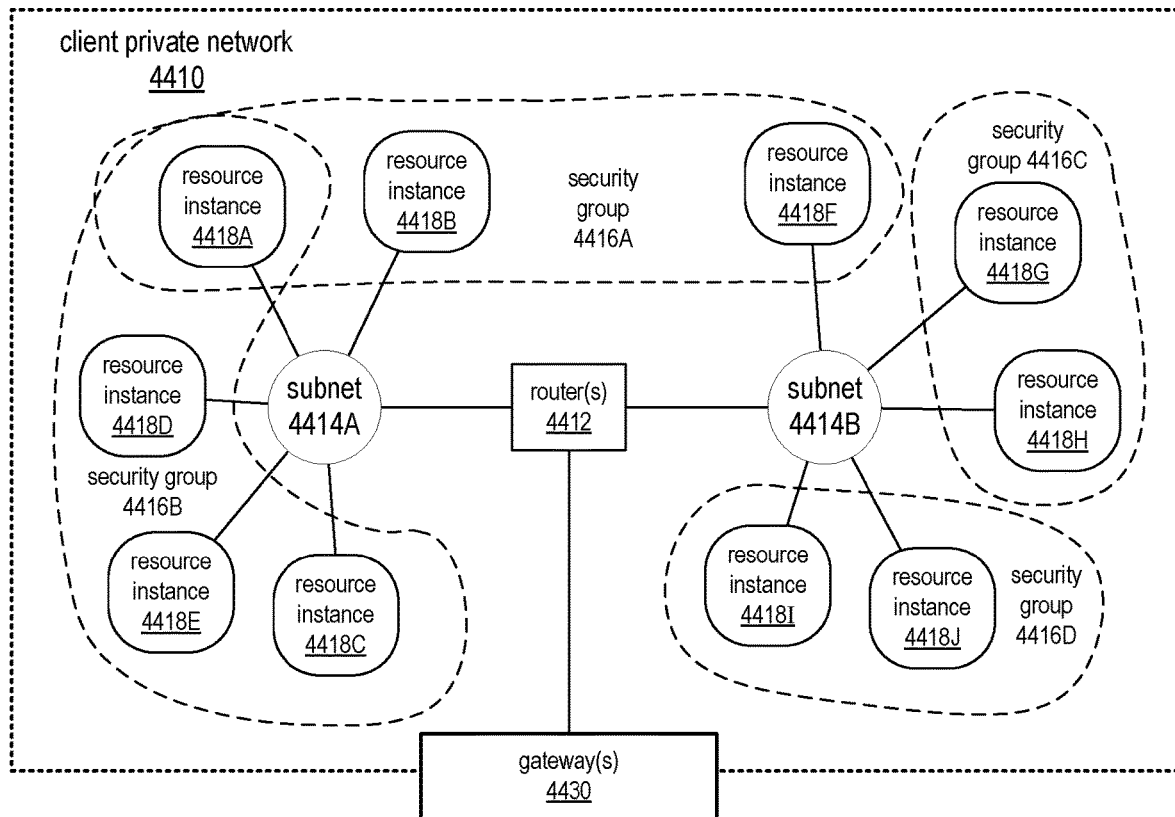
FIG. 16 illustrates subnets and security groups in an example virtual network implementation on a provider network, according to some embodiments.

As another example, in some embodiments, flow policy rules 138 may be applied at the subnets 150 in the virtual network 110. As shown in FIG. 16, each subnet 150 may include at least one router that acts to route traffic to and from resource instances 118 on the respective subnet 150. In some embodiments, flow policy rules 138 may be implemented at a subnet 150's router and applied by a flow policy engine at the router to traffic to or from the instances 118 on the respective subnet 150.

As another example, in some embodiments, flow policy rules 138 may be implemented at various network appliances 114 in provider network 100. Example network appliances 114 may include, but are not limited to, firewalls, intrusion detection systems, virus scanning systems, traffic analysis systems, load balancers, network accelerators, encryption systems, and packet filtering systems. Network appliances 114 may be implemented as physical devices on the provider network 100 or as virtual machines on host devices on the provider network 100. Network appliances may be provided by the service provider, by third parties, or by the client. Network appliances 114 may be included in a virtual network 110 to operate on traffic within the virtual network 110 as shown by appliances 114A in FIG. 1A, or may be attached to the virtual network 110 to operate on traffic to or from the virtual network 110 as shown by appliances 114B and 114C in FIG. 1A. As shown in FIG. 1A, appliances 114B may lie on a path between the virtual network 110's gateways 112 and edge router(s) 102 of the provider network 100. As shown in FIG. 1A, the provider network 100 may provide virtualized data storage 120 of various types that the client may leverage via one or more provider network services 104 to store data of various types on the provider network 100, and appliances 114C may lie on a path between the virtual network 110 and virtualized data storage 120 devices. In some embodiments, for network appliances 114 implemented as virtual machines on host devices on the provider network 100, flow policy rules 138 may be implemented on the respective host devices and applied by flow policy engines on the host devices. In some embodiments, for network appliances 114 implemented as physical machines on the provider network 100, flow policy rules 138 may be implemented on the respective devices and applied by flow policy engines on the devices.

As another example, in some embodiments, flow policy rules 138 may be implemented at one or more hosts 140 in provider network 100. FIG. 1B illustrates flow policy rules applied at components of a host 140 for virtual machines in a provider network environment, according to some embodiments. In at least some embodiments, a hypervisor or virtual machine monitor (VMM) 144 on a host 140 presents one or more clients' virtual resource instances implemented as VMs 148A-148n on the respective host 140 with a virtual platform and monitors the execution of the VMs 148 on the host 140. The VMM 144 and VMs 148A-148n may be implemented on and executed by components of the host 140, for example processor(s) and memory of the host 140.

In at least some embodiments, a host 140 may also include or may be coupled to one or more network processing devices 146A-146n that process network traffic (e.g., packet flows) between the VMs 148 on the host 140 and the provider network 100. Each network processing device 146A-146n may, for example, connect to a host I/O interface 142 (e.g., a PCI bus), and may receive client packets from and send client packets to client resource instances executing as VMs 148 on the host 140 via the host I/O interface 142. As a non-limiting example, a network processing device 146 may be a Peripheral Component Interconnect (PCI) device plugged into a PCI expansion slot or PCI bus of the host 140. A network processing device 146 may include one or more network ports connected to the provider network 100, and may receive provider network packets from and send provider network packets onto the provider network 100 via the port(s). A network processing device 146 may also include, but is not limited to, one or more processors (e.g., multicore processor(s)), a memory, and an internal I/O bus or interface. The processor(s) may be custom or proprietary processors, or alternatively may be general-purpose processors. A network processing device 146 may implement provider network packet processing functionality, for example as executable code stored in a memory that may be executed by the network processing device 146 processor(s) to apply provider network-related functions to packets received by the network processing device 146. For example, the provider network packet processing functionality may implement provider network encapsulation protocol technology to encapsulate and route IP packets over a network substrate within the provider network 100, and to decapsulate IP packets targeted at the VMs 148 on the host 140 and forward the decapsulated IP packets to the target VMs 148. In addition, a network processing device 146 may include virtual network packet processing functionality that may apply virtual network-related functions of the provider network 100 to at least some packets received by the network processing device 146.

In some embodiments, the flow policy service 130 may implement flow policy rules 138 for a client at the VMM 144 of a host 140. A flow policy engine of the VMM 144 may then apply the flow policy rules 138 to packet flows to and/or from the client's resource instances implemented as VMs 148 on the host 140. In some embodiments, instead or in addition, the flow policy service 130 may implement flow policy rules 138 for a client at one or more of the network processing devices 146 of a host 140. A flow policy engine on a network processing device 146 may then apply the flow policy rules 138 to packet flows to and/or from the client's resource instances implemented as VMs 148 on the host 140.

Referring again to FIG. 1A, in some embodiments, the flow policy service 130 may obtain flow logs from appliances 114 and/or network devices that apply flow policy rules (e.g., edge routers 102, hosts 140, gateways 112, subnets 150, etc.) and aggregate the flow logs to generate flow reports 139 for the client. The flow reports 139 may, for example, be used by the client to confirm that traffic to, from, or within their virtual network 110 is flowing through the correct network appliances 114 according to the flow policy rules 138.

FIG. 2 illustrates components and operation of an example flow policy service 230, according to some embodiments. A flow policy service 230 may be implemented by one or more computing devices on a provider network. As shown in FIG. 2, in some embodiments, flow policy service 230 may include, but is not limited to, a policy configuration 234 engine, an aggregation 236 engine, and one or more APIs 232. Policy configuration 234 may implement, but is not limited to, logic for receiving a policy specification 286 from an interface 284 on a client device 282 via API 232A, logic for parsing the specification 286 to generate flow policy rules 238, logic for determining where on the provider network (i.e., at which appliances 214 and/or network devices 208) to implement the flow policy rules 238 in order to apply the policy specification 286 on the provider network, and logic for implementing the flow policy rules 238 at the determined locations via API 232B. Aggregation 236 engine may implement, but is not limited to, logic for receiving flow logs from appliances 214 and/or network devices 208 via API 232B, and logic for aggregating and formatting the flow logs to provide flow reports 239 to the interface 284 on client device 282 via API 232A.

In various embodiments, the flow policy rules 238 may be implemented on devices in the provider network in different ways. In some embodiments, the flow policy rules 238 may be implemented according to a domain-specific language and may be executed by policy engines on the devices to apply the rules to the client's packet flows on the provider network. In other embodiments, the flow policy rules may be implemented as entries in flow tables; the policy engines on the devices may look up policy rules to apply to the client's packets according to information about the packets (e.g., source and/or destination addresses in the packet headers).

In various embodiments, the flow policy rules 238 may be applied by devices on the provider network in several different ways. FIGS. 3 through 6 illustrate several methods for applying the flow policy rules 238 that may be used in some embodiments.

Figure 3:
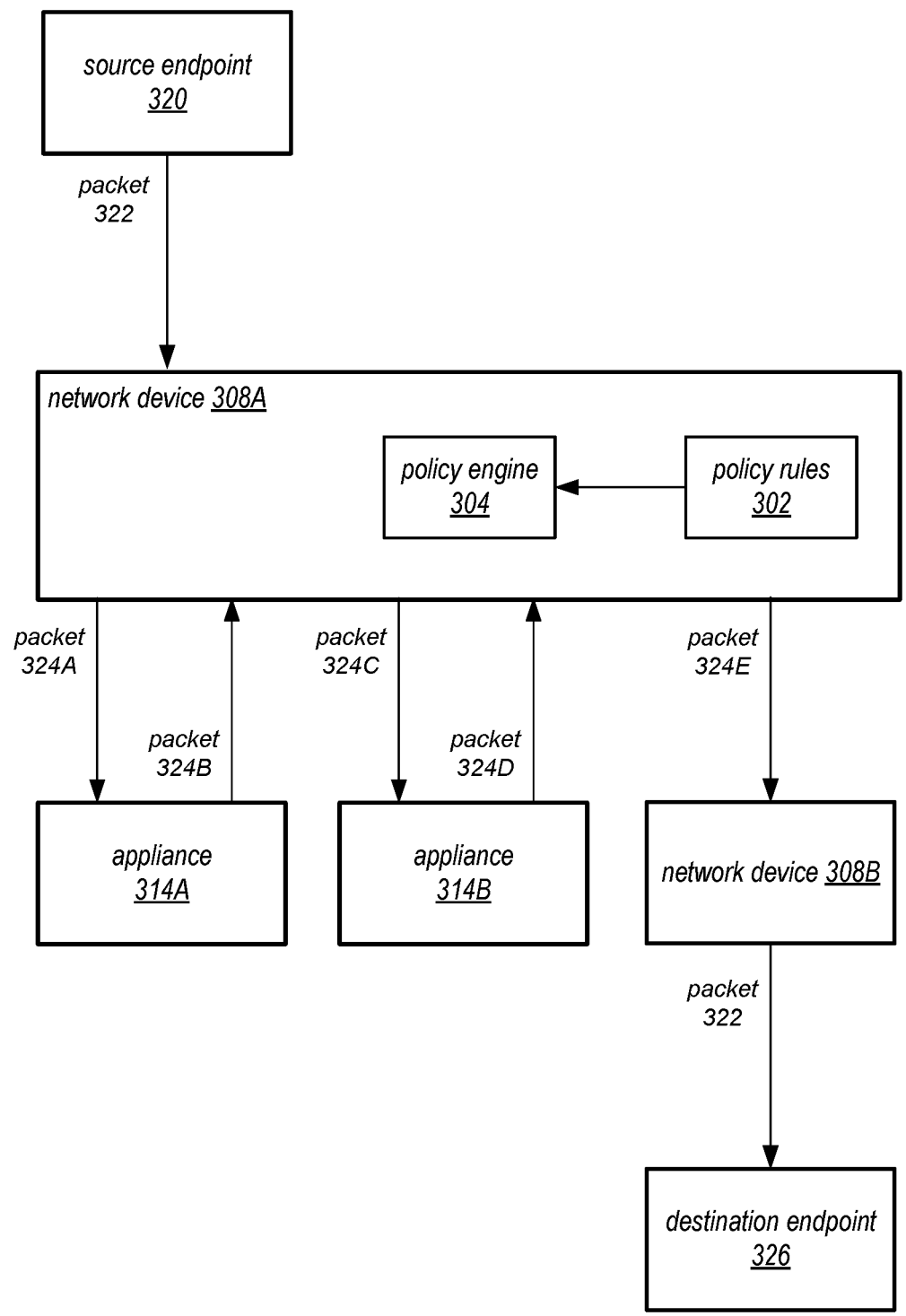
FIG. 3 illustrates directing traffic through a series of appliances on a provider network according to flow policy rules, according to some embodiments.

FIG. 3 illustrates directing traffic through a series of appliances on a provider network according to flow policy rules, according to some embodiments. A network device 308A of the network control plane (e.g., an edge router 102 as illustrated in FIG. 1A, a host 140 as illustrated in FIG. 1B, a network processing device 146 on a host 140 as illustrated in FIG. 1B, or some other network device on the provider network 100 as illustrated in FIG. 1A) may receive a network protocol packet 322 (e.g., a TCP or UDP packet) from a source endpoint 320. The source endpoint 320 may, for example, be an instance 118 (VM) in the client's virtual network 110 as shown in FIG. 1A, an endpoint on the provider network 100 but external to the client's virtual network 110, or an endpoint external to the provider network 100 (e.g., an external entity 190 as shown in FIG. 1A). The packet 324A may include a header that includes source and destination addresses for the packet 324A. The destination address may indicate a destination endpoint 326 for the packet 324A; the destination endpoint 326 may, for example, be an instance 118 (VM) in the client's virtual network 110, an endpoint on the provider network 100 but external to the client's virtual network 110, or an endpoint external to the provider network 100 (e.g., an external entity 190 as shown in FIG. 1A).

The network device 308A may be configured with flow policy rules 302 for the client's virtual network 110. In some embodiments, a policy engine 310 of the network device 308A that received the packet 322 from source endpoint 320 may evaluate the client packet 324A according to the rules 302. For example, to evaluate the packet 322, the policy engine 310 may apply the source and/or destination addresses in the packet header to the rules 302 to determine a particular rule for this packet 322. For example, a rule determined for this packet 322 may state that packets from the source address or address range to the destination address or address range should pass through appliance 314A and then through appliance 314B before being delivered to the destination endpoint 326. The network device 308A then encapsulates the client packet 322 to generate an overlay network packet 324A, and sends the packet 324A over the network substrate to a device on the provider network that implements appliance 314A. Appliance 314A may then process the client packet 322. After the packet 322 is processed by appliance 314A, an overlay network packet 324B encapsulating the processed client packet 322 may be returned by the device that implements appliance 314A over the network substrate to the network device 308A. The network device 308A then sends an overlay network packet 324C encapsulating the processed client packet 322 over the network substrate to a device on the provider network that implements appliance 314B. Appliance 314B may then process the client packet 322, and an overlay network packet 324D encapsulating the processed client packet 322 is returned by the device that implements appliance 314B over the network substrate to the network device 308A. The network device 308A then sends an overlay network packet 324E encapsulating the processed client packet 322 on to the network substrate to be routed by the network control plane to a network device 308B (e.g., an edge router 102 as illustrated in FIG. 1A, or a network processing device 146 on a host 140 as illustrated in FIG. 1B) that removes the encapsulation and sends the client packet 322 to the destination endpoint 326.

Figure 4:
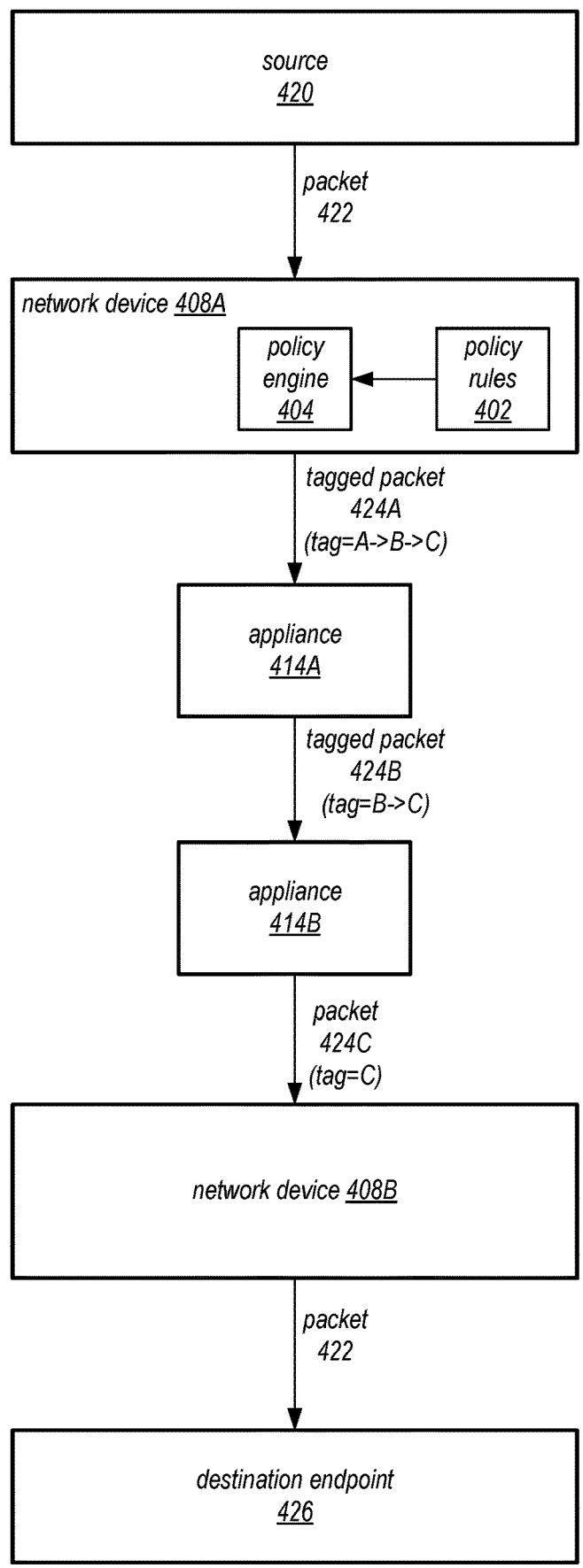
FIG. 4 illustrates tagging packets to direct the packets through appliances on a provider network according to flow policy rules, according to some embodiments.

The method as illustrated in FIG. 3 may generate extra network traffic as packets may be sent back and forth from the network device 308A to multiple appliances 314 before reaching the destination endpoint 326. In an alternative method, to reduce network traffic, the overlay network packets may be tagged with flow policy information that defines the path through appliances that the packet is to take so that a receiving device that implements an appliance can send the packet on to a next device on the path as defined by the flow policy. FIG. 4 illustrates tagging packets to direct the packets on a path through appliances on a provider network according to flow policy rules, according to some embodiments. A network device 408A of the network control plane (e.g., an edge router 102 as illustrated in FIG. 1A, a host 140 as illustrated in FIG. 1B, a network processing device 146 on a host 140 as illustrated in FIG. 1B, or some other network device on the provider network 100 as illustrated in FIG. 1A) may receive a network protocol packet 422 (e.g., a TCP or UDP packet) from a source endpoint 420. The source endpoint 420 may, for example, be an instance 118 (VM) in the client's virtual network 110 as shown in FIG. 1A, an endpoint on the provider network 100 but external to the client's virtual network 110, or an endpoint external to the provider network 100 (e.g., an external entity 190 as shown in FIG. 1A). The packet 422 may include a header that includes source and destination addresses for the packet 422. The destination address may indicate a destination endpoint 426 for the packet 422; the destination endpoint 426 may, for example, be an instance 118 (VM) in the client's virtual network 110, an endpoint on the provider network 100 but external to the client's virtual network 110, or an endpoint external to the provider network 100 (e.g., an external entity 190 as shown in FIG. 1A).

Figure 8A:
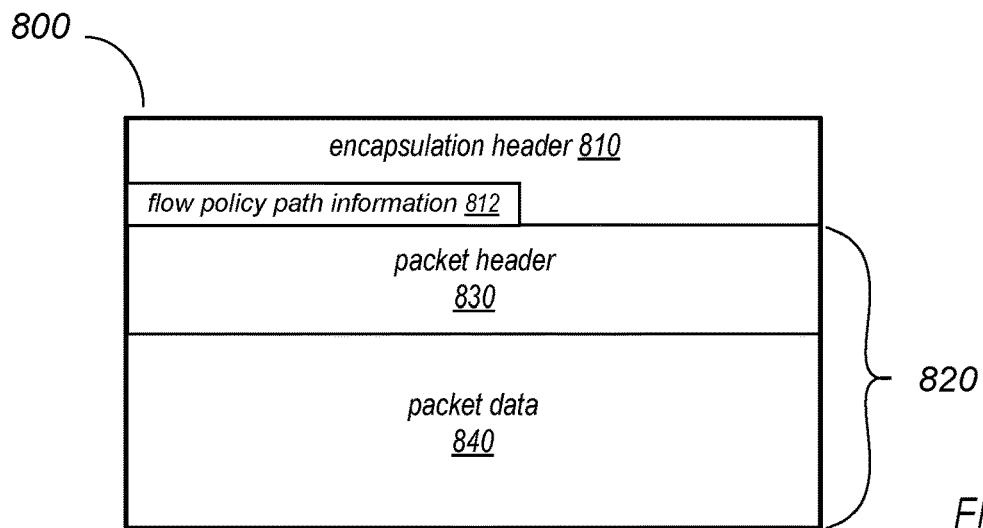
FIGS. 8A through 8C illustrate metadata that may be added to packets in a provider network to support flow policies, according to some embodiments.

The network device 408A may be configured with flow policy rules 402 for the client's virtual network 110. In some embodiments, a policy engine 404 of the network device 408A that received the packet 420 from source endpoint 422 may evaluate the client packet 422 according to the rules 402. For example, to evaluate the packet 422, the policy engine 404 may apply the source and/or destination addresses in the packet header to the rules 402 to determine a particular rule for this packet 420. For example, a rule determined for this packet 422 may state that packets from the source address or address range to the destination address or address range should pass through appliance 414A and then through appliance 414B before being delivered to the destination endpoint 426. The network device 408A encapsulates the client packet 422 to generate an overlay network packet 424A. The network device 408A tags the packet 424A with flow policy information that indicates a path through one or more appliances that the client packet 422 should take according to the determined rule, for example by writing the path information as metadata in the encapsulation header as illustrated in FIG. 8A. In this example, the path information indicates that the client packet 422 should first go to appliance 414A, then to appliance 414B, and from there to the destination endpoint 426. The network device 408A sends the tagged packet 424A over the network substrate to a device on the provider network that implements appliance 414A. Appliance 414A may then process the client packet 422.

After the client packet 422 is processed by appliance 414A, the device that implements appliance 414A generates a tagged overlay network packet 424B encapsulating the processed client packet 422 and tagged with the remaining portion of the path. In this example, the path information in packet 424B indicates that the client packet 422 should go to appliance B, and from there to the destination endpoint 426. The device that implements appliance 414A then sends overlay network packet 424B to a device on the provider network that implements appliance 414B. Appliance 414B may then process the client packet 422.

After the client packet 422 is processed by appliance 414B, the device that implements appliance 414B generates a tagged overlay network packet 424C encapsulating the processed client packet 422 and tagged with the remaining portion of the path. In this example, the path information in packet 424C indicates that the client packet 422 should go to the destination endpoint 426. The device that implements appliance 414B then sends packet 424C on to the network substrate to be routed by the network control plane to a network device 408B (e.g., an edge router 102 as illustrated in FIG. 1A, a host 140 as illustrated in FIG. 1B, or a network processing device 146 on a host 140 as illustrated in FIG. 1B) that removes the encapsulation and sends the client packet 422 to the destination endpoint 426.

Figure 5:
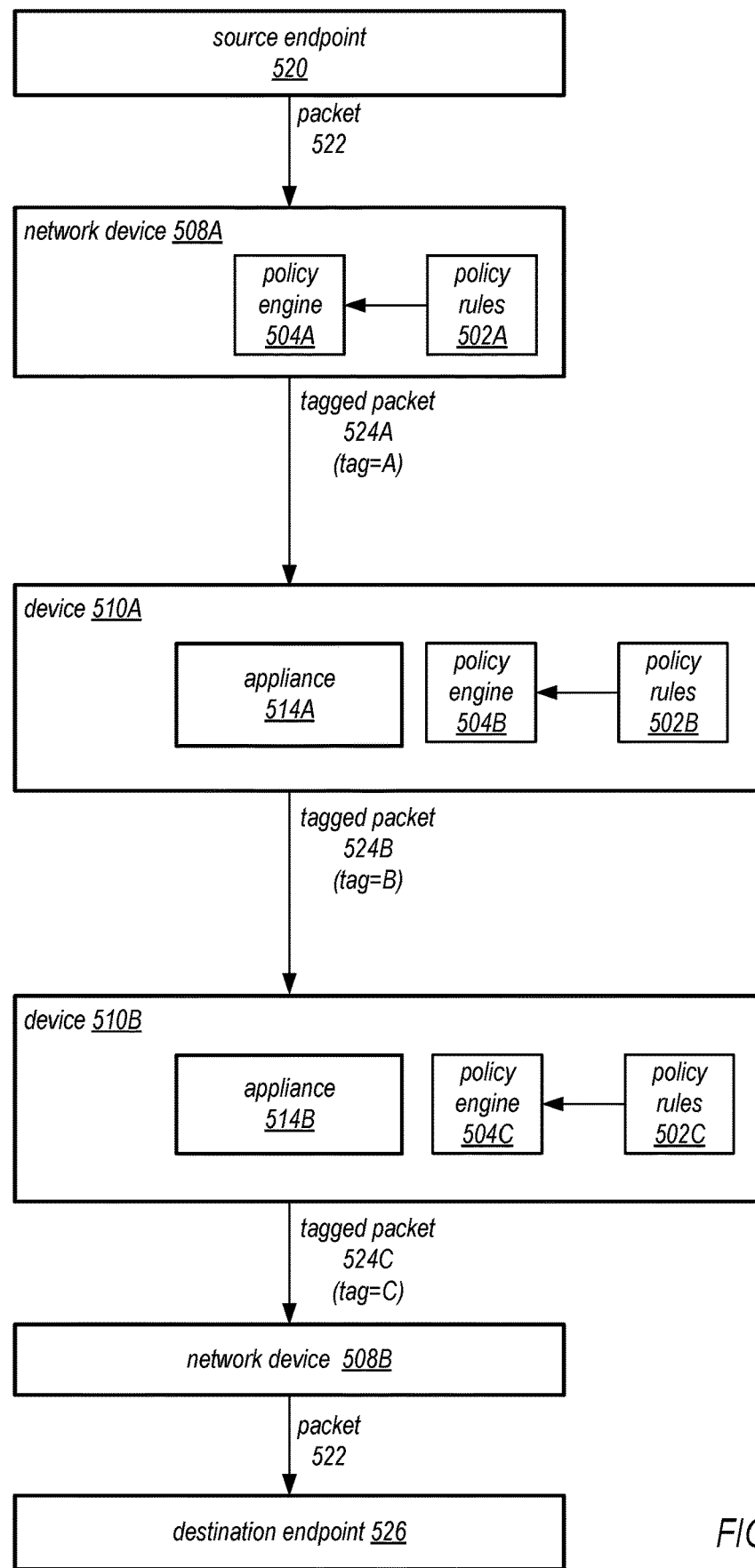
FIG. 5 illustrates directing packets through appliances on a provider network according to flow policy rules implemented at the devices that host the appliances, according to some embodiments.

FIG. 5 illustrates directing packets through appliances on a provider network according to flow policy rules implemented at the devices that host the appliances, according to some embodiments. In this method, in addition to network appliances applying policy rules to packets, policy rules may also be applied at the devices that implement the appliances that are on paths that the client's packets should take. Rather than a network device 408A that receives a packet 422 from the source endpoint 420 tagging the packet with the full path information as indicated by the flow policy rules prior to sending the packet onto the network substrate to a first appliance 414 as in the method of FIG. 4, the network device 508A (e.g., an edge router 102 as illustrated in FIG. 1A, or a network processing device 146 on a host 140 as illustrated in FIG. 1B) that receives the packet 522 from source endpoint 520 tags the packet with information for routing the packet to a first device 510 that implements an appliance 514A as determined from the policy rules. The network device 508A may be configured with flow policy rules 502A for the client's virtual network 110. A policy engine 504A of the network device 508A that received the packet 520 from source endpoint 522 may evaluate the client packet 522 according to rules 502A. For example, to evaluate the packet 522, the policy engine 504A may apply the source and/or destination addresses in the packet header to the rules 502A to determine a particular rule for this packet 520. For example, a rule determined for this packet 522 may state that packets from the source address or address range to the destination address or address range should be sent to appliance 514A. The network device 508A encapsulates the client packet 522 to generate an overlay network packet 524A, and tags the packet 524A with metadata in the encapsulation header as illustrated in FIG. 8A. In this example, the metadata indicates that the packet 524A should go to appliance 514A. The network device 508A sends the tagged packet 524A over the network substrate to a device 510A on the provider network that implements appliance 514A. Appliance 514A may then process the client packet 522.

The device 510A that implements appliance 514A may be configured with flow policy rules 502B for the client's virtual network 110. A policy engine 504B of the device 510A may evaluate the client packet 522 according to rules 502B. For example, to evaluate the packet 522, the policy engine 504B may apply the source and/or destination addresses in the packet header to the rules 502B to determine a particular rule for this packet 520. For example, a rule determined for this packet 522 may state that packets from the source address or address range to the destination address or address range should be sent to appliance 514B. The device 510A encapsulates the client packet 522 to generate an overlay network packet 524B, and tags the packet 524B with metadata that indicates that the packet 524B should go to appliance 514B. The device 510A sends the tagged packet 524B over the network substrate to a device 510B on the provider network that implements appliance 514B. Appliance 514B may then process the client packet 522.

The device 510B that implements appliance 514B may be configured with flow policy rules 502C for the client's virtual network 110. A policy engine 504C of the device 510B may evaluate the client packet 522 according to rules 502C. For example, to evaluate the packet 522, the policy engine 504C may apply the source and/or destination addresses in the packet header to the rules 502C to determine a particular rule for this packet 520. For example, a rule determined for this packet 522 may state that packets from the source address or address range to the destination address or address range should be sent from appliance 514B to the destination endpoint 526. The device 510B encapsulates the client packet 522 to generate an overlay network packet 524C, and tags the packet 524C with metadata that indicates that the packet 524C should go to destination endpoint 526. The device 510B then sends packet 524C on to the network substrate to be routed by the network control plane to a network device 508B (e.g., an edge router 102 as illustrated in FIG. 1A, a host 140 as illustrated in FIG. 1B, or a network processing device 146 on a host 140 as illustrated in FIG. 1B) that removes the encapsulation and sends the client packet 522 to the destination endpoint 526.

Figure 6:
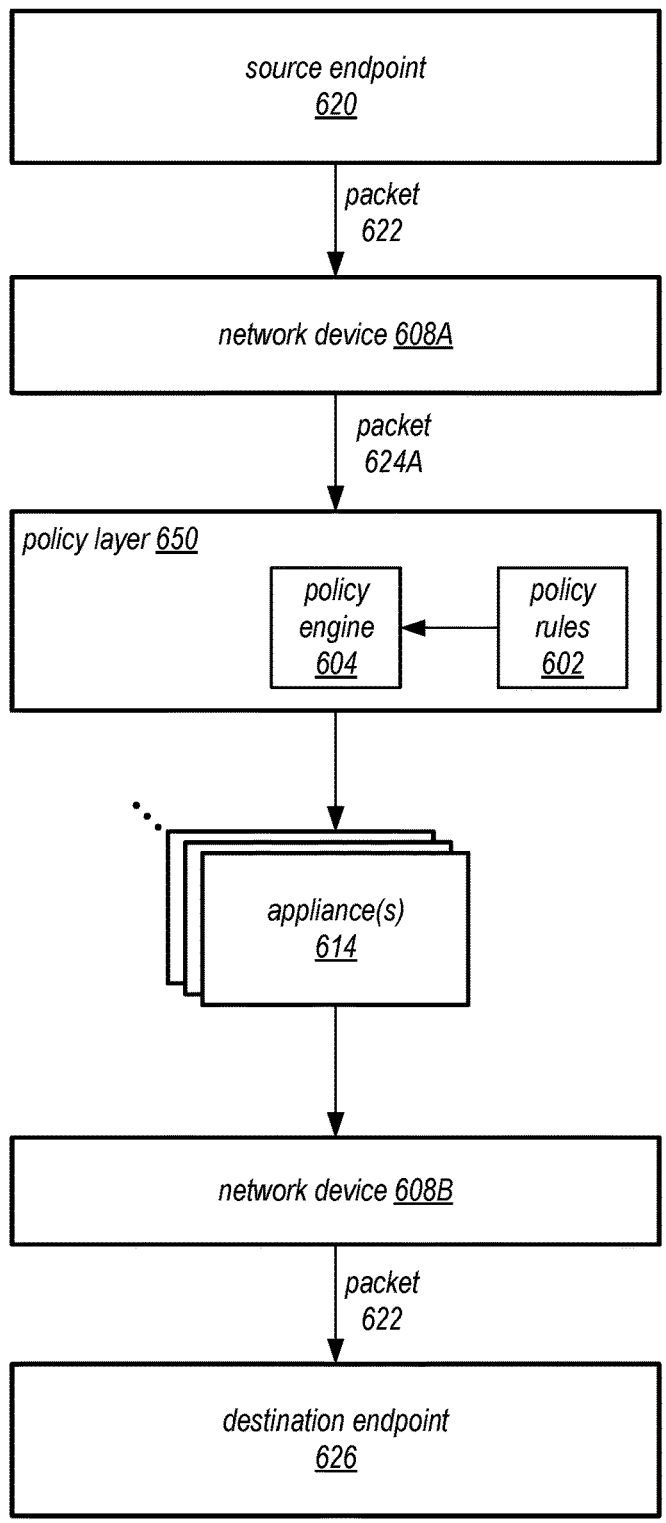
FIG. 6 illustrates a policy layer that applies flow policy rules on a provider network, according to some embodiments.

FIG. 6 illustrates a policy layer that applies flow policy rules on a provider network, according to some embodiments. In these embodiments, a policy layer 650 implemented by one or more virtual or physical devices on the provider network may implement and apply policy rules 602 for a client's private network. Rather than a network device 608A that receives a packet 622 from the source endpoint 620 tagging the packet with path information as indicated by the flow policy rules prior to sending the packet onto the network substrate as in the methods of FIGS. 4 and 5, the network device 608A (e.g., an edge router 102 as illustrated in FIG. 1A, a host 140 as illustrated in FIG. 1B, or a network processing device 146 on a host 140 as illustrated in FIG. 1B) that receives the packet 622 from the source endpoint 620 encapsulates the packet 622 to generate an overlay network packet 624A and sends the packet 624A to the policy layer 650. A policy engine 604 of the policy layer 650 evaluates the packet 622 according to policy rules 602 to determine a rule to apply to this packet 622 and thus a path through one or more appliances 614 that the packet 622 should take before being sent to network device 608B for delivery to the destination endpoint 626. In some embodiments, the policy layer 650 may use a method similar to the method illustrated in FIG. 3 to apply the determined policy rule to the packet 622. In some embodiments, the policy layer 650 may use a method similar to the method illustrated in FIG. 4 to apply the determined policy rule to the packet 622. In some embodiments, the policy layer 650 may use a method similar to the method illustrated in FIG. 5 to apply the determined policy rule to the packet 622.

Conditional Evaluation for Packet Flows

Figure 7A:
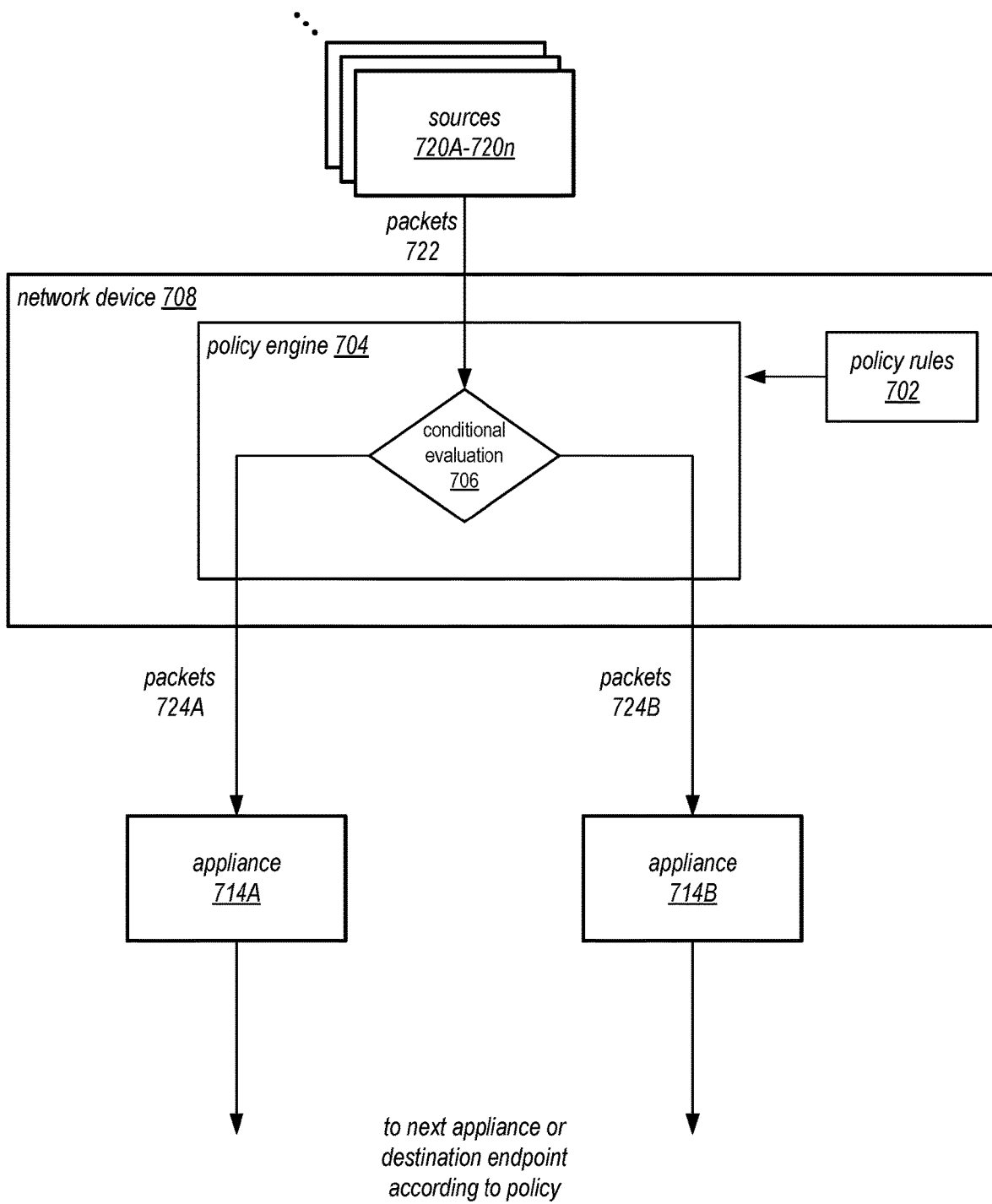
FIGS. 7A and 7B illustrate conditional evaluation of packets according to flow policy rules, according to some embodiments.
Figure 7B:
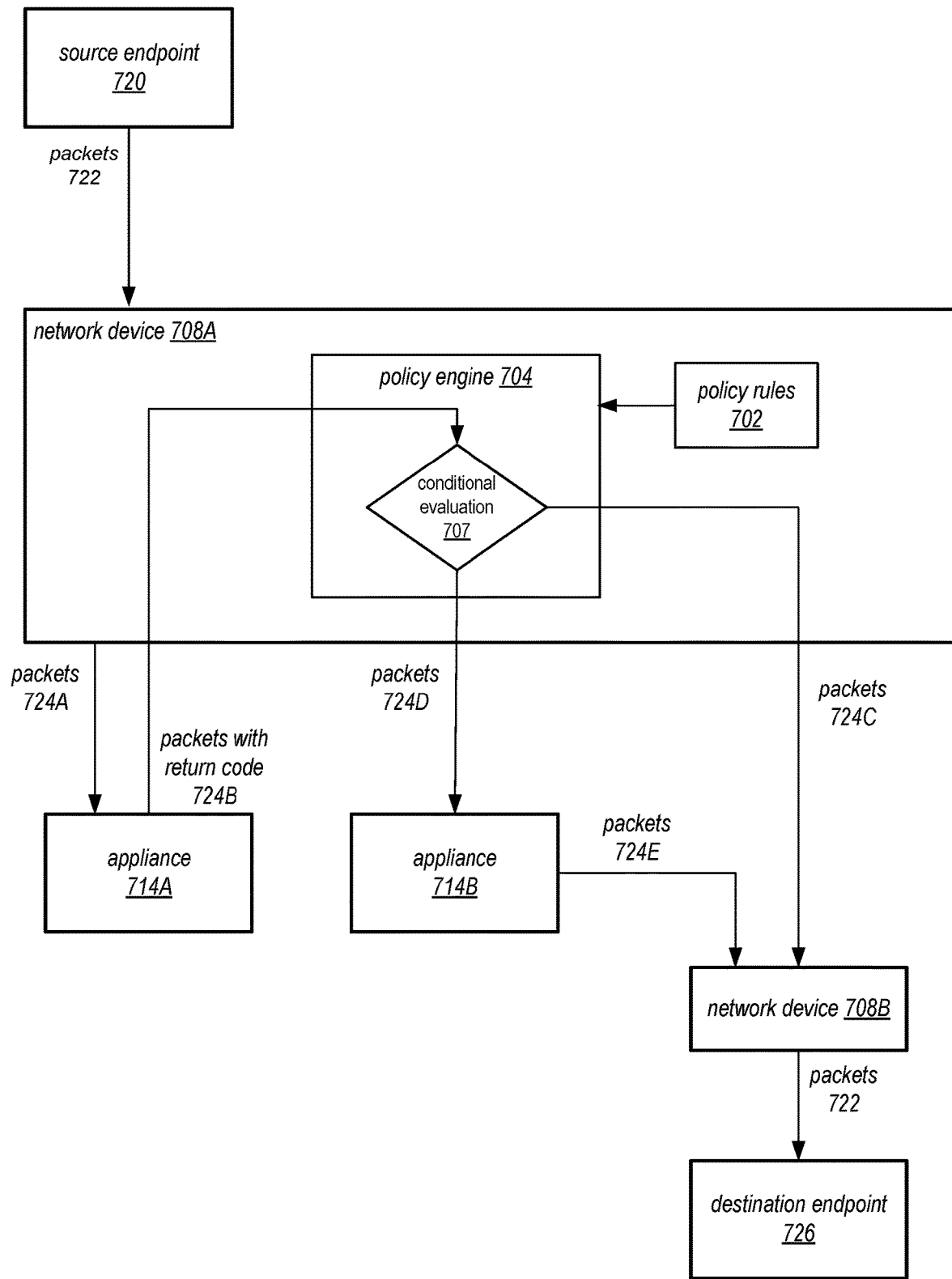

In some embodiments, logic may be embedded in a flow policy that dictates what happens to traffic after it leaves a network appliance. The embedded logic may, for example, allow the conditional routing of a client's packets on the network based on evaluation of information about the packets (e.g., information in the packet headers), information generated by packet processing functionality of the network appliances, and/or other information such as metrics related to resource usage in the virtual network. FIGS. 7A and 7B illustrate examples of conditional evaluation of packets according to flow policy rules, according to some embodiments.

FIG. 7A provides an example of conditional evaluation of packets according to flow policy rules in which a network device receives client packets, evaluates the client packets according to flow policy rules, and makes decisions according to the evaluation as to which appliances the client packets should go. For example, a flow policy rule may indicate that all incoming client packets for a client's virtual network that are within a source address range A are to go to appliance A, and all incoming client packets for the client's virtual network within a source address range B are to go to an appliance B.

In FIG. 7A, a network device 708 (e.g., an edge router 102 as illustrated in FIG. 1A, a host 140 as illustrated in FIG. 1B, a network processing device 146 on a host 140 as illustrated in FIG. 1B, or some other network device on the provider network 100 as illustrated in FIG. 1A) may receive client packets 722 from one or more sources 720A-720n. The sources 720A-720n may, for example, be instances 118 (VMs) in the client's virtual network 110 as shown in FIG. 1A, endpoints on the provider network 100 but external to the client's virtual network 110, or endpoints external to the provider network 100 (e.g., external entities 190 as shown in FIG. 1A). The packets 722 may include headers that include source and destination addresses for the packets 722. The destination addresses may indicate destination endpoints for the packets 722; the destination endpoints may, for example, include instances 118 (VMs) in the client's virtual network 110, endpoints on the provider network 100 but external to the client's virtual network 110, or endpoints external to the provider network 100 (e.g., external entities 190 as shown in FIG. 1A).

A flow policy engine 704 on the device 708 may evaluate 706 the client packets 722 according to flow policy rules 702 based on information in the packet headers (e.g., the source and/or destination addresses), and make decisions according to the evaluation as to which network appliances or series of appliances the client packets 722 should pass through before being delivered to destination endpoints on the client's virtual network or to an endpoint external to the client's virtual network. For example, a flow policy rule may indicate that all incoming client packets for a client's virtual network that are within a source address range A are to go to appliance 714A, and all incoming client packets for the client's virtual network within a source address range B are to go to an appliance 714B. Client packets 722 that are within source address range A are encapsulated by the network device 708 to generate overlay network packets 724A that are sent to appliance 714A over the network substrate, and client packets 722 that are within source address range B are encapsulated by the network device 708 to generate overlay network packets 724B that are sent to appliance 714B over the network substrate. After processing by appliance 714A or 714B, the packets 722 are sent to a next appliance or to their destination endpoint(s) in the client's virtual network according to the flow policy for the client's virtual network. For example the flow policy may indicate that the packets 722 processed by appliance 714B are to go to appliance 714A, while packets 722 processed by appliance 714A are to go to their destination endpoints.

FIG. 7B provides another example of conditional evaluation of packets according to flow policy rules in which a network device evaluates output codes for client packets processed by a network appliance to determine what to do with the processed client packets according to the flow policy rules. For example, a flow policy rule may indicate that all outgoing client packets from a client's virtual network are to first go to appliance A; on egress from appliance A, if an output code from appliance A is a particular value, send the traffic to appliance B for further processing; otherwise, send the traffic to an Internet gateway for delivery to a destination endpoint.

In FIG. 7B, a network device 708A (e.g., an edge router 102 as illustrated in FIG. 1A, a host 140 as illustrated in FIG. 1B, a network processing device 146 on a host 140 as illustrated in FIG. 1B, or some other network device on the provider network 100 as illustrated in FIG. 1A) may receive client packets 722 from a source endpoint 720. The source endpoint 720 may, for example, be an instance 118 (VM) in the client's virtual network 110 as shown in FIG. 1A, an endpoint on the provider network 100 but external to the client's virtual network 110, or an endpoint external to the provider network 100 (e.g., an external entity 190 as shown in FIG. 1A). The packet 722 may include a header that includes source and destination addresses for the packet 722. The destination address may indicate a destination endpoint 726 for the packet 722; the destination endpoint 726 may, for example, be an instance 118 (VM) in the client's virtual network 110, an endpoint on the provider network 100 but external to the client's virtual network 110, or an endpoint external to the provider network 100 (e.g., an external entity 190 as shown in FIG. 1A).

Figure 8B:
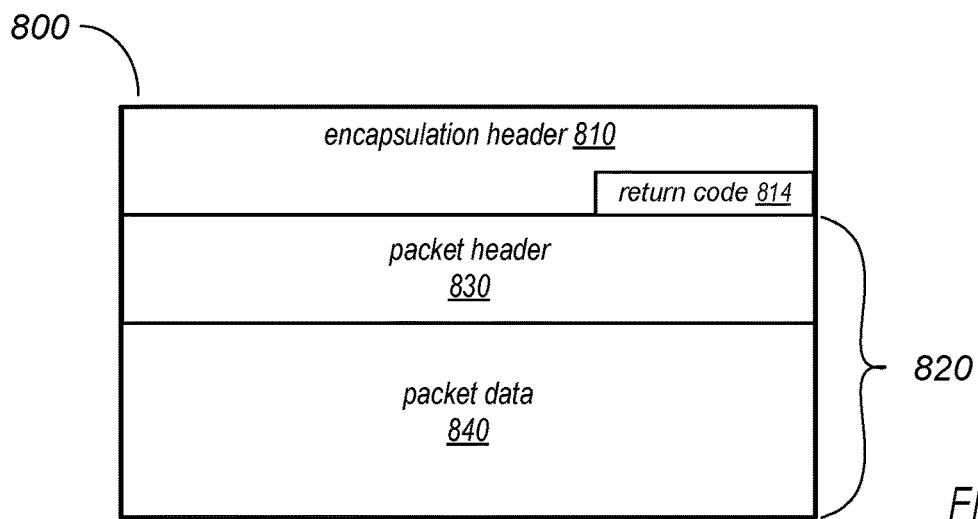
Figure 8C:
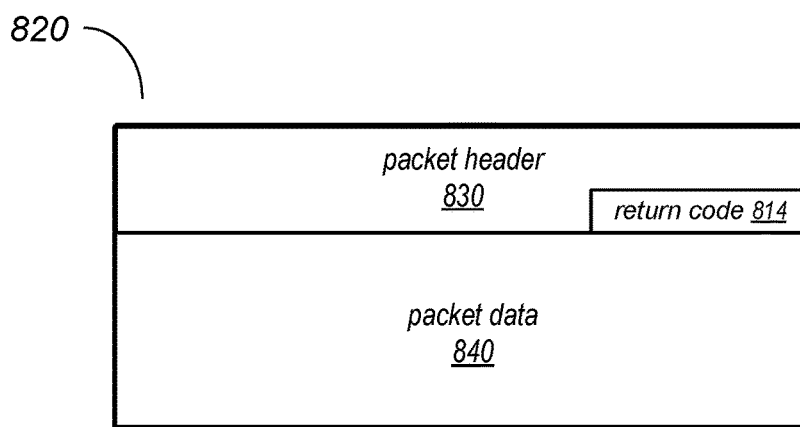

A flow policy engine 704 on the network device 708A may evaluate the client packet 722 according to flow policy rules 702, for example based on information in the packet headers (e.g., the source and/or destination addresses), to determine which network appliances or series of appliances the client packet 722 should pass through before being delivered to destination endpoints on the client's virtual network or to an endpoint external to the client's virtual network. For example, a rule may be determined for this packet 722 that indicates that packets from the source address or address range to the destination address or address range should first go to appliance 714A. The network device 708A then encapsulates the client packet 722 to generate an overlay network packet 724A, and sends the packet 724A over the network substrate to a device on the provider network that implements appliance 714A. Appliance 714A may then process the client packet 722, and may output a code that represents one of two or more results of the processing for the packet 722. After the packet 722 is processed by appliance 714A, the device that implements appliance 714A generates an overlay network packet 724B encapsulating the processed client packet 722; the output code may be added to the packet 724B, for example as metadata in the encapsulation header as shown in FIG. 8B, or as metadata in the client packet header as shown in FIG. 8C. The packet 724B may then be sent over the network substrate back to the network device 708A.

The flow policy engine 704 on the network device 708A may determine where to send packets 722 returned from appliance 714A based on a conditional evaluation 707 of a flow policy rule 702 for the output codes included in the overlay network packets 724 returned from appliance 714A. For example, a flow policy rule 702 may indicate that, on return of a packet 722 from appliance 714A, if the output code from appliance 714A is a particular value (e.g., 0), send the packet 722 to network device 708B for delivery to the destination endpoint 726; otherwise, send the packet 722 to an appliance 714B for further processing.

The flow policy engine 704 may perform the conditional evaluation 707 for the output code in packet 724B. If the output code is 0, the network device 708A generates an overlay network packet 724C encapsulating the processed client packet 722 and sends the packet 724C over the network substrate to network device 708B for delivery to the destination endpoint 726. Network device 708B removes the encapsulation and sends the client packet 722 to the destination endpoint 726. If the output code is some other value, the network device 708A generates an overlay network packet 724D encapsulating the client packet 722 and sends the packet 724D over the network substrate to the device that implements appliance 714B for additional processing by appliance 714B. Appliance 714B may then process the client packet 722. After the packet 722 is processed by appliance 714B, the device that implements appliance 714B generates an overlay network packet 724E encapsulating the processed client packet 722 and sends the packet 724E over the network substrate to network device 708B for delivery to the destination endpoint 726. Network device 708B removes the encapsulation and sends the client packet 722 to the destination endpoint 726.

In some embodiments, the output codes and the actions to which the codes are mapped may be defined by the client. The following provides a few examples of output codes, and is not intended to be limiting:

- a code that indicates that a respective packet is to be sent to a network device that implements another network appliance for additional processing.
- a code that indicates that a respective packet is to be sent to its destination endpoint.
- a code that indicates that a respective packet is to be dropped.
- a code that indicates that a respective packet is to be dropped and that an error code is to be sent, for example to the packet's source endpoint or to another network device, network appliance, or service.
- a code that indicates that an out-of-band message is to be sent to a service.

Flow Policy Packet Metadata

In some embodiments, metadata for applying a client's flow policies to their packet flows to, from, or within the client's virtual network as described herein may be added to overlay network packets and/or client packets. FIGS. 8A through 8C illustrate metadata that may be added to packets in a provider network to support flow policies, according to some embodiments.

FIG. 8A shows an overlay network packet 800 that encapsulates a client packet 820. Client packet 820 may, for example, be a network protocol packet (e.g., a TCP or UDP packet). The client packet 820 may include packet data 840 and a packet header 830 that includes source and destination addresses for the packet 820, as well as other metadata for the packet 820. Overlay network packet 800 includes an encapsulation header 810 according to a provider network encapsulation protocol that includes information for routing the packet over the overlay network on the provider network substrate. The encapsulation header 810 may also include flow policy path information 812 that indicates a path through one or more appliances that the client packet 820 should take according to the flow policy rules for the client's virtual network. For example, the path information 812 may indicate that the client packet 820 should first go to appliance A, then to appliance B, and from there to its destination endpoint. The flow policy path information 812 may, for example, be added to the packet header 810 according to either of the methods illustrated in FIG. 4 or 5.

FIG. 8B shows an overlay network packet 800 that encapsulates a client packet 820. In this example, the encapsulation header 810 may include a return code 814 field for output codes generated by appliances as illustrated in FIG. 7B. FIG. 8C shows that the return code 814 field may instead be included in the client packet header 830.

Flowcharts of Flow Policy Methods

Figure 9:
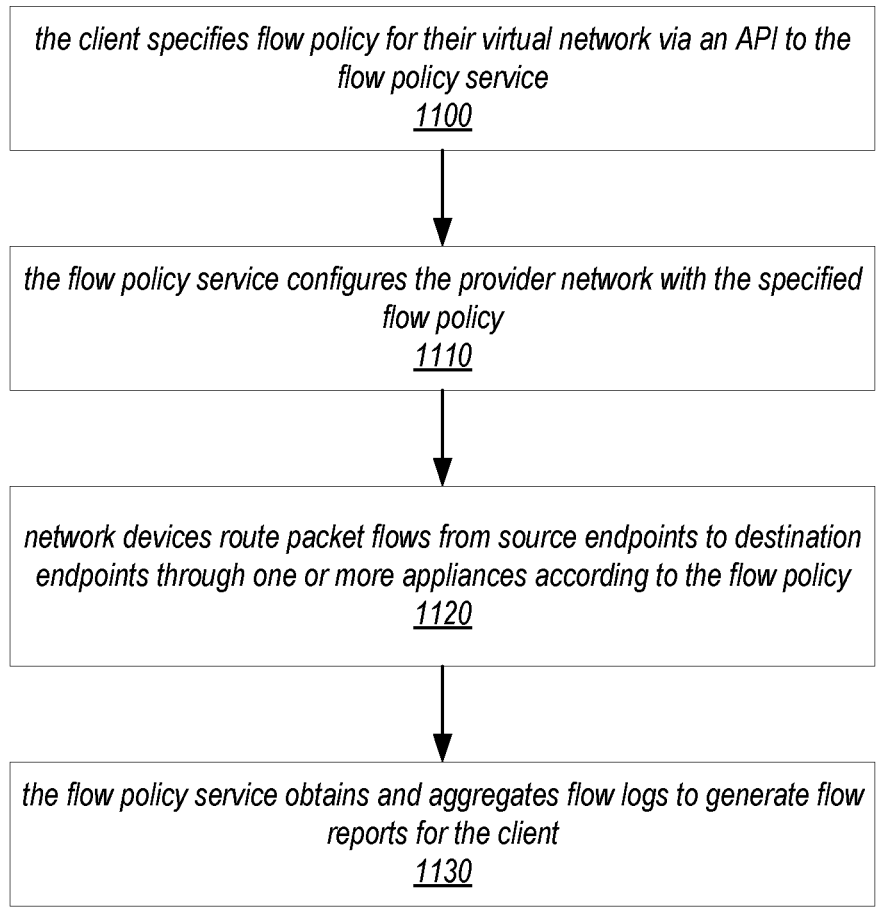
FIG. 9 is a high-level flowchart of a method for applying flow policies for a virtual network in a provider network, according to some embodiments.

FIG. 9 is a high-level flowchart of a method for applying flow policies for a virtual network in a provider network, according to some embodiments. As indicated at 1100, the client specifies flow policy for their virtual network, for example via an API to the flow policy service. In some embodiments, the flow policy rules may be specified in a descriptive domain-specific language. A non-limiting example of such a rule may be something like "FPS rule: <Instance A> outbound: <Appliance A> <Appliance B> <Gateway>" that specifies that outbound traffic from instance A should flow through appliance A, and then through appliance B, and then to a gateway, where FPS is the flow policy service. In some embodiments, the flow policy rules may be specified by the client in human-friendly ways. A non-limiting example of such a rule may be something like "All traffic from instance A should flow through appliance A and then appliance B before exiting through a gateway to the Internet."

As indicated at 1110, the flow policy service configures the provider network with the specified flow policy. The flow policy service determines how and where on the provider network to implement flow policy rules in order to apply the client's specified flow policy on the provider network. The flow policy service may determine at what devices on the provider network flow policy rules to implement the flow policy need to be applied, and what the flow policy rules at those devices should be. The flow policy service then configures the determined devices with the determined flow policy rules. Referring to FIG. 1A, the determined devices may include one or more of, but are not limited to, provider network edge routers, devices that implement appliances, host devices that implement the client's instances, devices that implement virtual network gateways, devices that implement subnet routes, or in general any device on the network that implements networking functionality related to the client's virtual network. Thus, the actual implementation of the flow policy for the client's virtual network on the provider network may be hidden from the client. In some embodiments, if an appliance specified by the client in a policy does not exist, an instance of the appliance may be generated by the flow policy service, for example via an appropriate provider network service.

As indicated at 1120, the devices that are configured with the client's flow policy rules may apply the flow policy rules to route client packets in packet flows from source endpoints to destination endpoints through one or more network appliances attached to or within the client's virtual network according to the client's flow policy. Any of the methods described in reference to FIGS. 3 through 7B, FIG. 9, or FIG. 10 may be used to apply the flow policy rules to the client packets on the provider network.

As indicated at 1130, in some embodiments, the flow policy service may obtain and aggregate flow logs to generate flow reports for the client. The network appliances attached to or within a client's virtual network may generate flow logs based on the client packets processed at the network appliances. In some embodiments, network devices (e.g., edge routers, host devices, etc.) that apply flow policy rules may also generate flow logs. The flow logs may, for example, be collected and aggregated by the flow policy service to generate flow reports that may be used by the client to confirm that traffic to, from, or within their virtual network is flowing through the correct network appliances according to the flow policy rules.

Figure 10:
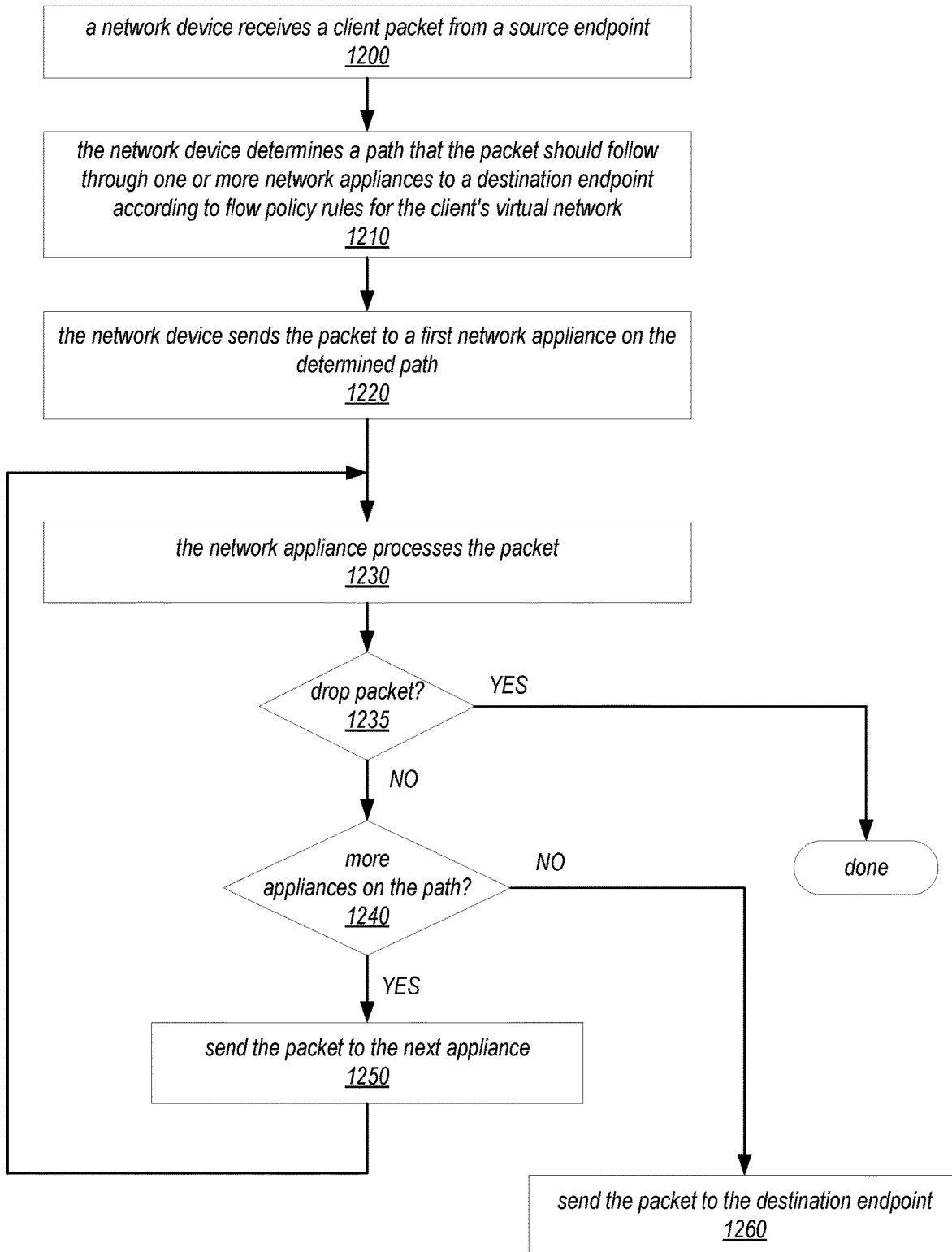
FIG. 10 is a flowchart of a method for processing packets according to flow policy rules on a provider network, according to some embodiments.

FIG. 10 is a flowchart of a method for processing packets according to flow policy rules on a provider network, according to some embodiments. As indicated at 1200, a network device receives a client packet from a source endpoint. The source endpoint may, for example, be an instance in the client's virtual network, an endpoint on the provider network but external to the client's virtual network, or an endpoint external to the provider network.

As indicated at 1210, the network device determines a path that the packet should follow through one or more network appliances to a destination endpoint according to flow policy rules for the client's virtual network. The network device may be configured with flow policy rules for the client's virtual network. In some embodiments, a policy engine of the network device may evaluate the client packet according to the flow policy rules to determine the path. For example, to evaluate the packet, the policy engine may apply the source and/or destination addresses in the packet header to the rules to determine a particular rule for this packet that specifies one or more network appliances that the packet should go through before being delivered to the destination endpoint. The network appliances may include, but are not limited to, firewalls, intrusion detection systems, virus scanning systems, traffic analysis systems, load balancers, network accelerators, encryption systems, and packet filtering systems.

As indicated at 1220, the network device sends the client packet to a first network appliance on the determined path. In some embodiments, the network device may encapsulate the network packet according to an encapsulation protocol and send the encapsulated packet over an overlay network on the provider network to be routed to a device on the provider network that implements the network appliance. In some embodiments, flow policy path information may be added to the encapsulation header as illustrated in FIG. 8A.

As indicated at 1230, the network appliance processes the packet according to its functionality. In some embodiments, the device that implements the network appliance may decapsulate the client packet and provide the client packet to the network appliance for processing. In some embodiments, a network appliance may determine at 1230 that a packet being processed should be dropped. At 1235, if the packet is to be dropped, then the method terminates for this packet. Otherwise, the method proceeds to element 1240.

At 1240, after the network appliance processes the packet, if there are no more network appliances on the path, the packet is sent to the destination endpoint as indicated at 1260. The destination endpoint may, for example, be an instance in the client's virtual network, an endpoint on the provider network but external to the client's virtual network, or an endpoint external to the provider network. At 1240, if there are more network appliances on the path, then the packet is sent to the next network appliance as indicated at 1250, and the method returns to element 1230 where the next appliance processes the packet. In some embodiments as illustrated in FIG. 3, after a network appliance processes a packet at 1230, the packet is returned to the network device, and the network device performs elements 1240 and 1250 or 1260. In some embodiments as illustrated in FIG. 4 or 5, after a network appliance processes a packet at 1230, the device that implements the network appliance performs elements 1240 and 1250 or 1260.

Figure 11:
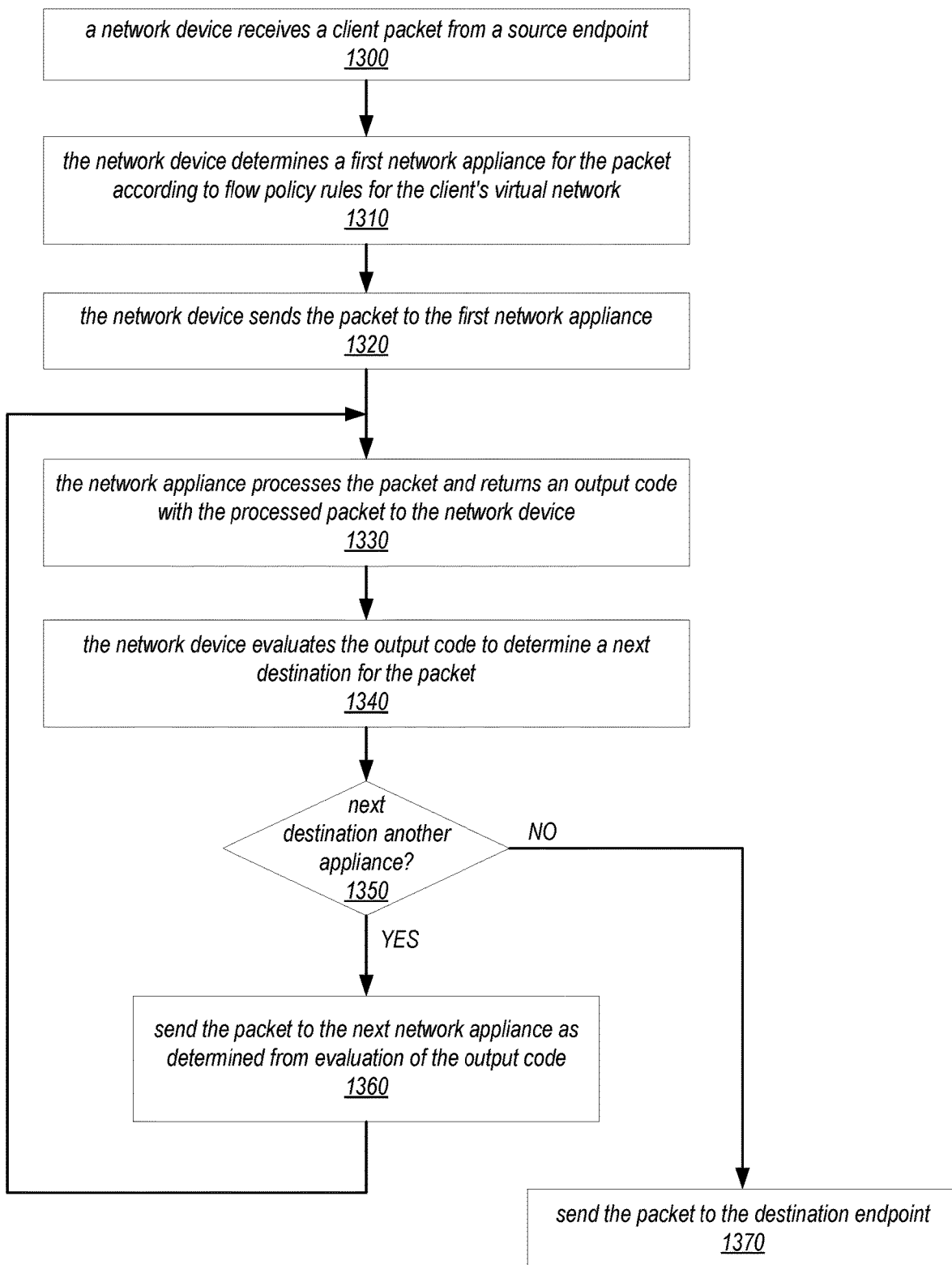
FIG. 11 is a flowchart of a method for processing packets according to conditional flow policy rules on a provider network, according to some embodiments.

FIG. 11 is a flowchart of a method for processing packets according to conditional flow policy rules on a provider network, according to some embodiments. As indicated at 1300, a network device receives a client packet from a source endpoint. The source endpoint may, for example, be an instance in the client's virtual network, an endpoint on the provider network but external to the client's virtual network, or an endpoint external to the provider network.

As indicated at 1310, the network device determines a first network appliance for the packet according to flow policy rules for the client's virtual network. The network device may be configured with flow policy rules for the client's virtual network. In some embodiments, a policy engine of the network device may evaluate the client packet according to the flow policy rules to determine the path. For example, to evaluate the packet, the policy engine may apply the source and/or destination addresses in the packet header to the rules to determine a particular rule for this packet that specifies a first network appliances that the packet should go to. The first network appliance may, for example, be a firewall, an intrusion detection system, a virus scanning system, a traffic analysis system, a load balancer, a network accelerator, an encryption system, or a packet filtering system.

As indicated at 1320, the network device sends the packet to the first network appliance. In some embodiments, the network device may encapsulate the network packet according to an encapsulation protocol and send the encapsulated packet over an overlay network on the provider network to be routed to a device on the provider network that implements the network appliance.

As indicated at 1330, the network appliance processes the packet and returns an output code with the processed packet to the network device. The output code may, for example, be captured and added to metadata (e.g., in a packet header) for the packet as illustrated in FIG. 8B or 8C. While not shown in FIG. 10, in some embodiments, a network appliance may determine at 1330 that a packet being processed should be dropped. If so, then the method terminates for this packet. Otherwise, the method proceeds to element 1340.

As indicated at 1340, the network device evaluates the output code according to the flow policy rules to determine a next destination for the packet. For example, a flow policy rule may indicate that, on return from the first network appliance, if the output code for the packet is a particular value (e.g., 0), send the packet to its destination endpoint; otherwise, send the packet to a second network appliance specified by the rule for further processing. While not shown in FIG. 10, in some embodiments, the output code may indicate that the packet should be dropped. If so, then the method terminates for this packet. Otherwise, the method proceeds to element 1350.

At 1350, if the network device determines that the next destination for the packet is the destination endpoint, then the packet is sent to the destination endpoint as indicated at 1370. The destination endpoint may, for example, be an instance in the client's virtual network, an endpoint on the provider network but external to the client's virtual network, or an endpoint external to the provider network. At 1350, if the network device determines that the next destination is another network appliance as determined from evaluation of the output code, then the network device sends the packet to the next network appliance as determined from evaluation of the output code as indicated at 1360, and the method returns to element 1330.

Example Flow Policy Rules and Use Cases

In some embodiments, the flow policy rules may be specified by the client in human-friendly ways. Non-limiting examples of human-friendly rule specifications may include:

"All traffic from instance A should flow through appliance A and appliance B before exiting through a gateway to the Internet."

"All traffic from the Internet to port Y on any instance should flow through appliance C."

"All inbound traffic to virtual network public gateway A should flow through appliance C before going to virtual network public gateway A."

"All traffic from subnet A to storage endpoint A should flow through appliance D."

"All traffic from subnet A to subnet B should flow through appliance E."

"All inbound traffic from address range A should flow through appliance F and then to appliance G."

"All outbound traffic from address range B should flow through appliance H."

"All traffic between virtual network A and virtual network B should flow through appliance I."

"All traffic to and from security group A should flow through appliance J."

In some embodiments, the flow policy rules may include conditional logic. Non-limiting examples of human-friendly rule specifications that include conditional logic may include:

"For inbound traffic to virtual network A, if the source address is in range A send the packets to appliance A, else if the source address is in range B drop the packets, else deliver the packets to the destination addresses."

"For inbound traffic to address range A, send the packets to appliance A; if the output code from appliance A is 0, deliver the packets to the destination addresses, otherwise send the packets to appliance B."

In some embodiments, the flow policy rules may be specified in a descriptive domain-specific language. In some embodiments, the flow policy service may parse human-friendly rules entered by the client to generate rules in the domain-specific language. Non-limiting pseudocode examples of policy rules in an example domain-specific language format may include:

"FPS rule: <Instance A> outbound: <Appliance A> <Appliance B> <Gateway>"
that specifies that outbound traffic from instance A should flow through appliance A, and then through appliance B, and then to an Internet gateway, where FPS is the flow policy service.

"FPS rule: <VN A> inbound: <Appliance C> <Gateway A> <Appliance D>"
that specifies that inbound traffic to virtual network A should flow through appliance C on the provider network, then to virtual network gateway A, and then to appliance D on virtual network A before being delivered to instances on virtual network A.

"FPS rule: <Subnet A> to <Storage Endpoint A>: <Appliance E>"
that specifies that traffic from subnet A to storage endpoint A on the provider network should flow through appliance E.

In some embodiments, the flow policy rules may include conditional logic. Non-limiting pseudocode examples of policy rules in an example domain-specific language format that include conditional logic may include:

"FPS rule: <VN A> inbound:
if <Source Address Range A> <Appliance A>;
else if <Source Address Range B> <Appliance A> <Appliance B>;
else <Drop>"
that specifies that inbound traffic to virtual network A from source address range A should flow through appliance A, inbound traffic to virtual network A from source address range B should flow through appliance A and then appliance B, and all other traffic should be blocked or dropped.

"FPS rule: <Subnet A> inbound: <Appliance A>
if (output_code=0)<Subnet A>
else if (output_code=1)<Appliance B> <Subnet A>
else <Drop>"
that specifies that inbound packets to subnet A should flow through appliance A; if the output code from appliance A for a packet is 0, then the packet can be delivered to Subnet A; if the output code from appliance A is 1, then the packet is sent to appliance B for further processing before being delivered to subnet A; otherwise, the packet should be blocked or dropped.

Flow Reports

In some embodiments, the network appliances attached to or within a client's virtual network may generate flow logs based on the traffic processed at the network appliances. In some embodiments, network devices (e.g., edge routers, host devices, etc.) that apply flow policy rules may also generate flow logs. The flow logs may, for example, be collected and aggregated by the flow policy service to generate flow reports that may be used by the client to confirm that traffic to, from, or within their virtual network is flowing through the correct network appliances according to the flow policy rules.

A flow log from an appliance or network device may include information indicating all packet flows that pass through the appliance or device. For example, a packet flow entry may indicate the two endpoints for the respective packet flow, the number of packets that passed through the appliance or device on the packet flow, and other information about the packet flow through the device. The flow policy service may periodically or aperiodically collect flow logs from the appliances and/or network device, extract information from the flow logs related to packet flows that are relevant to a particular client, and from that extracted information construct an aggregated flow report for the client that indicates the paths through the provider network that the packet flows to, from, or within the client's virtual network actually follow. For example, the flow report may include entries for packet flows along the lines of:

Flow 1: <Time Stamp> <Packet Count>
<Endpoint A> <Endpoint B>: <Appliance A> <Appliance B>

Flow 2: <Time Stamp> <Packet Count>
<Endpoint C> <Endpoint D>: <Appliance A> <Appliance B>

Flow 3: <Time Stamp> <Packet Count>
<Endpoint D> <Endpoint E>: <Appliance C>

The client may examine the flow report to confirm that traffic to, from, or within their virtual network is flowing through the correct network appliances according to the flow policy rules. For example, <Endpoint A> may be an address within an address range of the Internet, and <Endpoint B> may be one of the client's resource instances on the virtual network, and the client can examine the flow report to determine that packet flows from within the address range are going through <Appliance A> and <Appliance B> before reaching the instance.

Example Provider Network Environment

This section describes example provider network environments in which embodiments of the methods and apparatus described in reference to FIGS. 1 through 11 may be implemented. However, these example provider network environments are not intended to be limiting.

Figure 12:
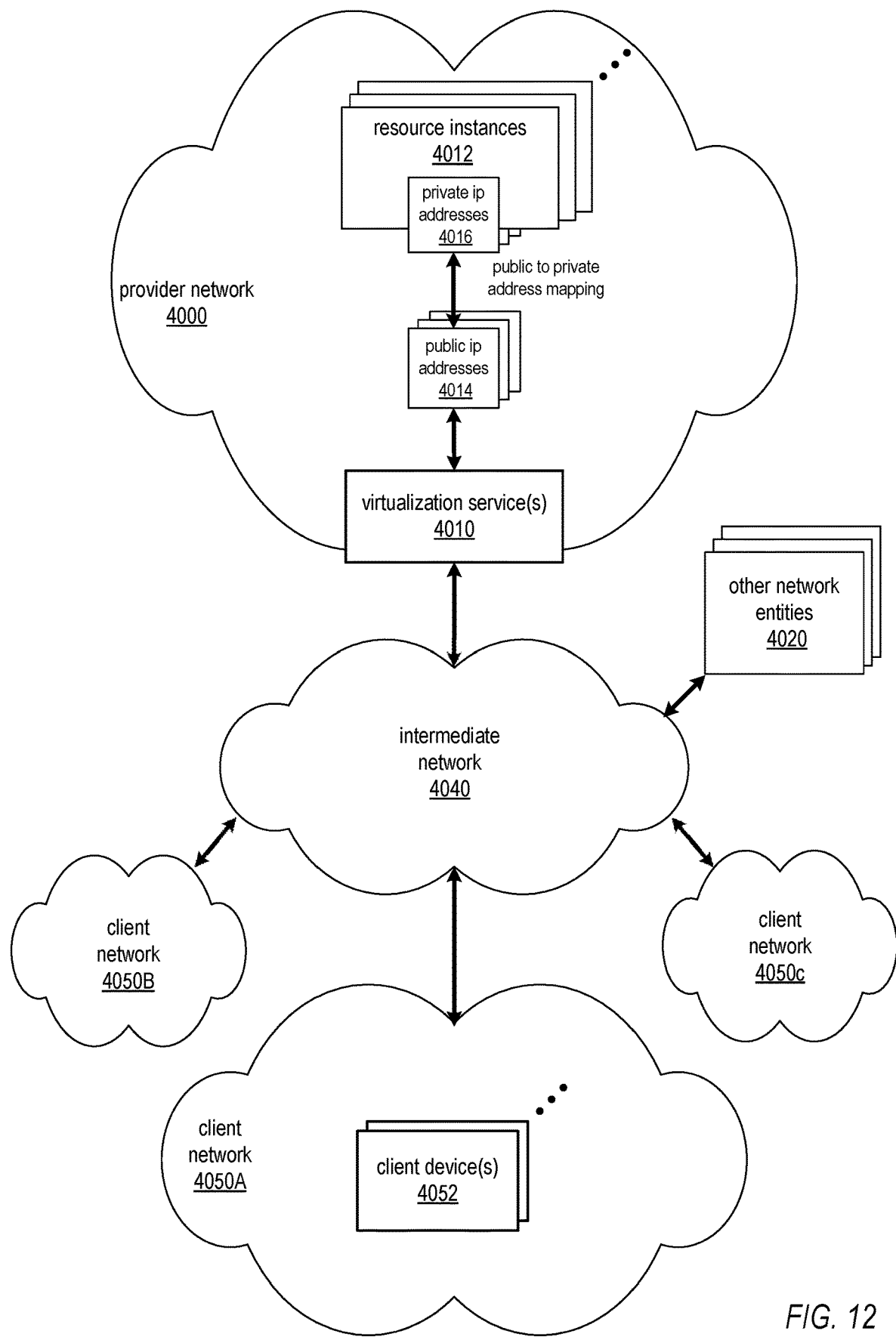
FIG. 12 illustrates an example provider network environment, according to some embodiments.

FIG. 12 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 13 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 13) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 13, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 13, at least some networks in which embodiments may be implemented may include hardware virtualization technology that enables multiple operating systems to run concurrently on a host computer (e.g., hosts 4120A and 4120B of FIG. 13), i.e. as virtual machines (VMs) 4124 on the hosts 4120. The VMs 4124 may, for example, be rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 13 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 4118, as virtualized resources to clients of a network provider in a similar manner.

Figure 14:
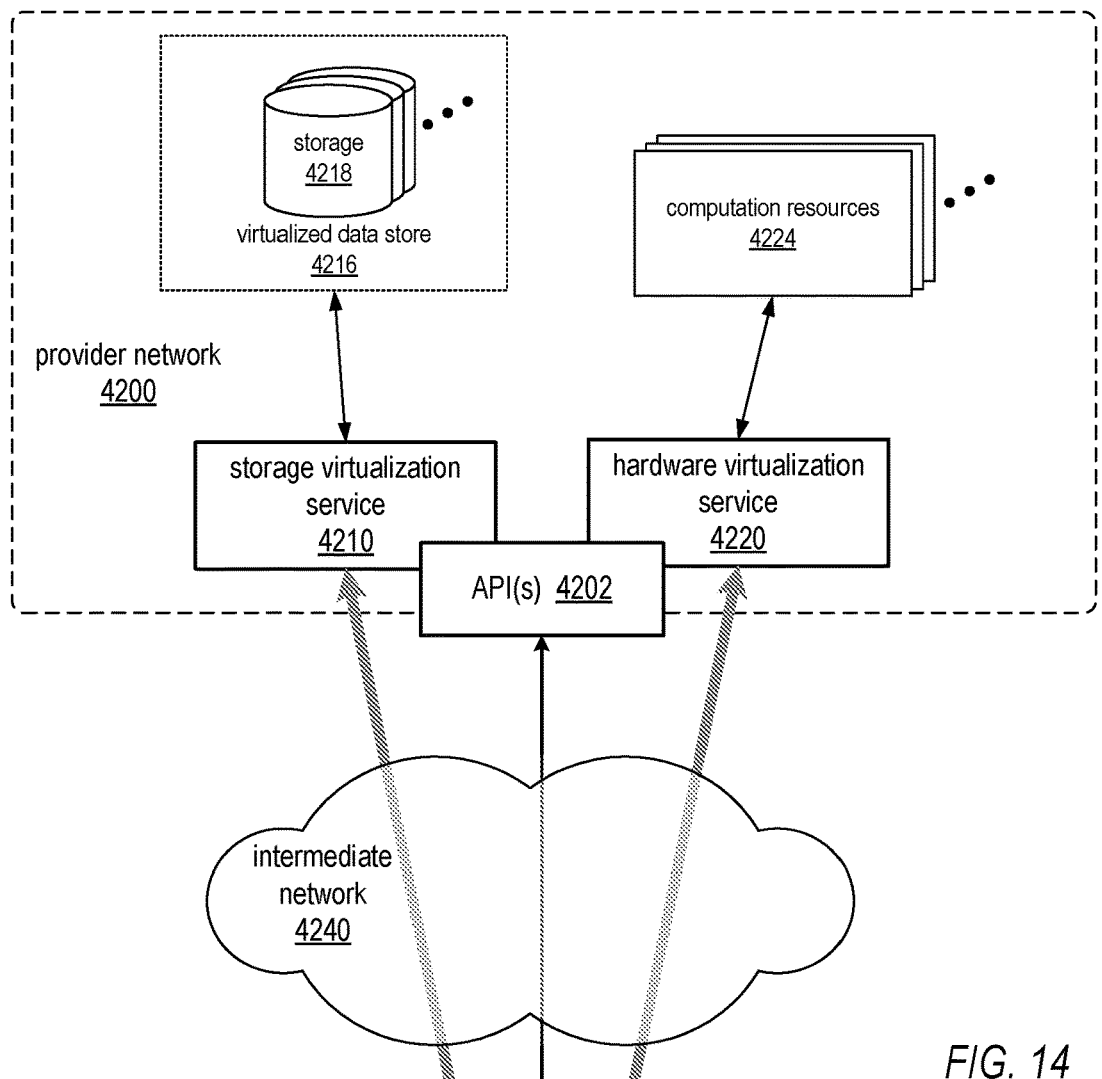
FIG. 14 is a block diagram of an example provider network that provides a storage virtualization service and a hardware virtualization service to clients, according to some embodiments.
Figure 14:
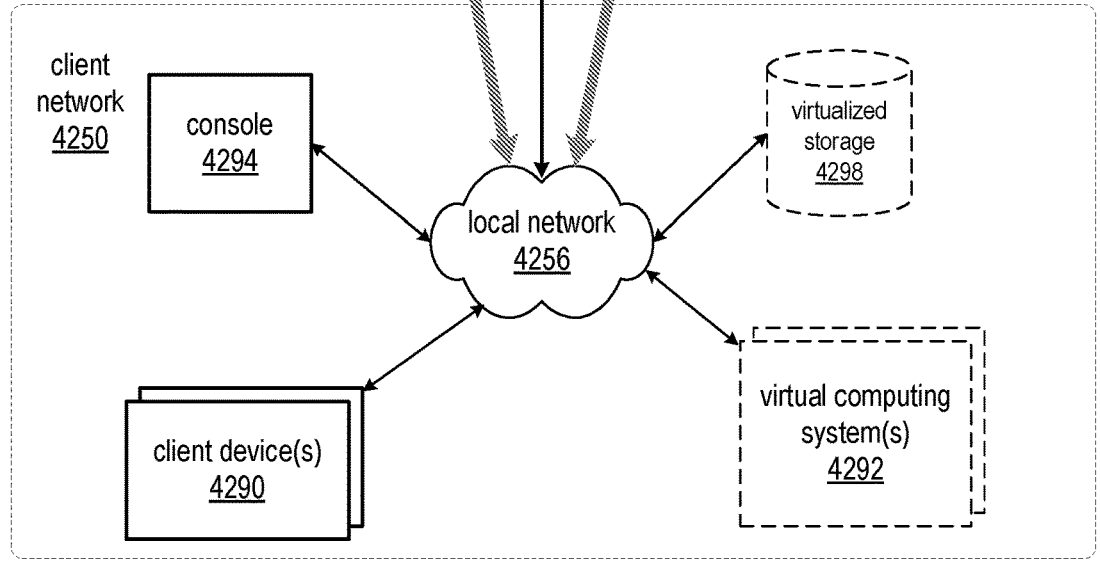

FIG. 14 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 14, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 15:
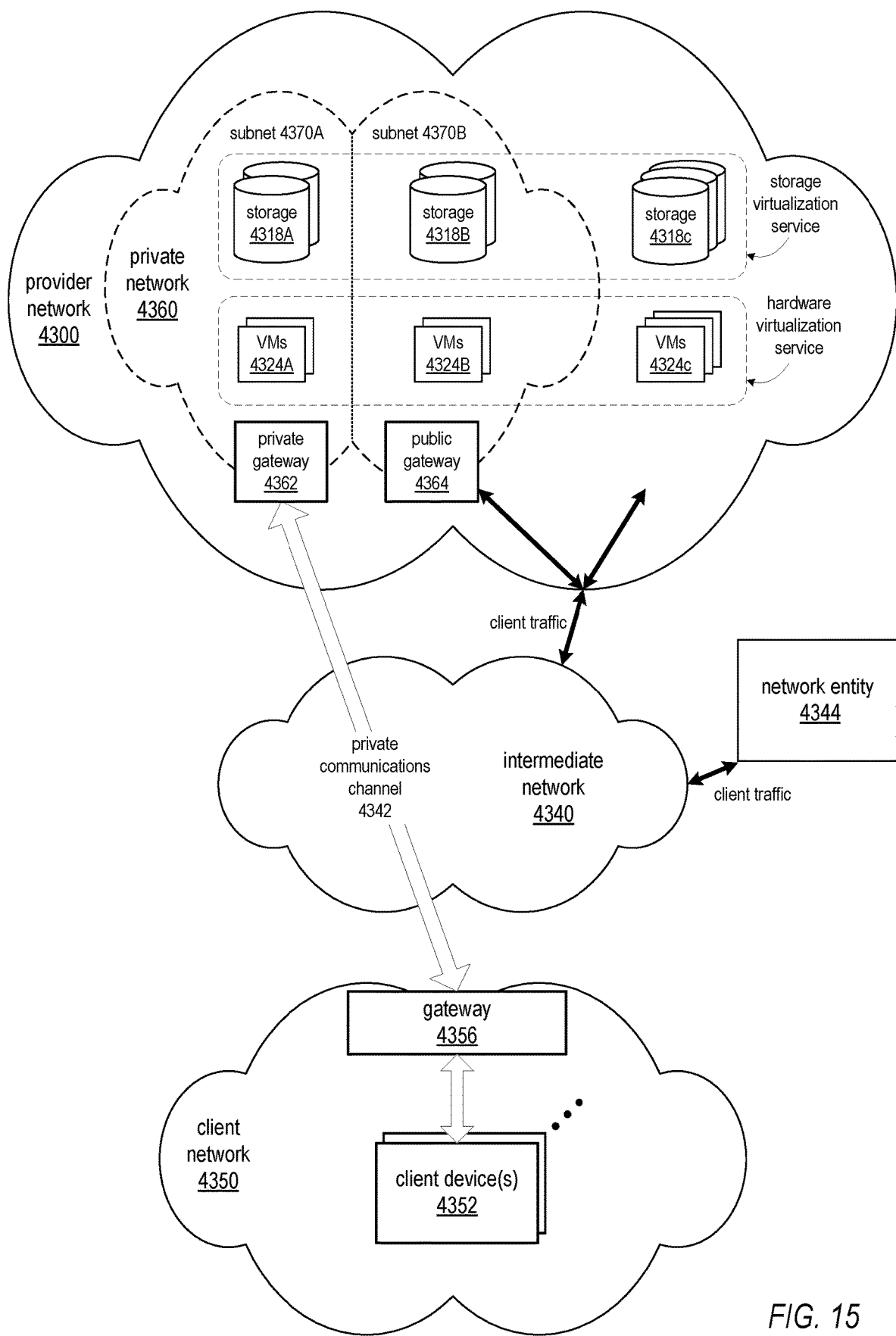
FIG. 15 illustrates an example provider network that provides virtual networks to at least some clients, according to some embodiments.

FIG. 15 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 15 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 15 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

FIG. 16 illustrates subnets and security groups in an example virtual network implementation on a provider network, according to some embodiments. In some embodiments, a provider network such as provider network 4300 in FIG. 15 may allow the client to establish and manage virtual security groups 4416 within the client's virtual network 4410, within or across subnets 4414. A security group 4416 is a logical grouping of resource instances 4418 and acts as a virtual firewall that controls the traffic allowed to reach one or more resource instances 4418 within the security group 4416 according to security group rules. The client may establish one or more security groups 4416 within the virtual network 4410, and may associate each resource instance 4418 in the virtual network 4410 with one or more of the security groups 4416. In some embodiments, the client may establish and/or modify rules for each security group 4416 that control the inbound traffic allowed to reach the resource instances 4418 associated with the security group 4416.

In the example virtual network 4410 shown in FIG. 16, the virtual network 4410 is subdivided into two subnets 4414A and 4414B. Access to the virtual network 4410 is controlled by gateway(s) 4430. Each subnet 4414 may include at least one router 4412 that acts to route traffic to (and from) resource instances 4418 on the respective subnet 4414. In some embodiments, network access control lists (ACLs) may be used to control access to the subnets 4414 at router(s) 4412. In the example shown in FIG. 16, resource instances 4418A through 4418E are on subnet 4414A, and resource instances 4418F through 4418J are on subnet 4414B. The client has established four security groups 4416A through 4416D. As shown in FIG. 16, a security group may extend across subnets 4414, as does security group 4416A that includes resource instances 4418A and 4418B on subnet 4414A and resource instance 4418F on subnet 4414B. In addition, a resource instance 4418 may be included in two or more security groups 4416, as is resource instance 4418A which is included in security group 4416A and 4416B.

Illustrative System

Figure 17:
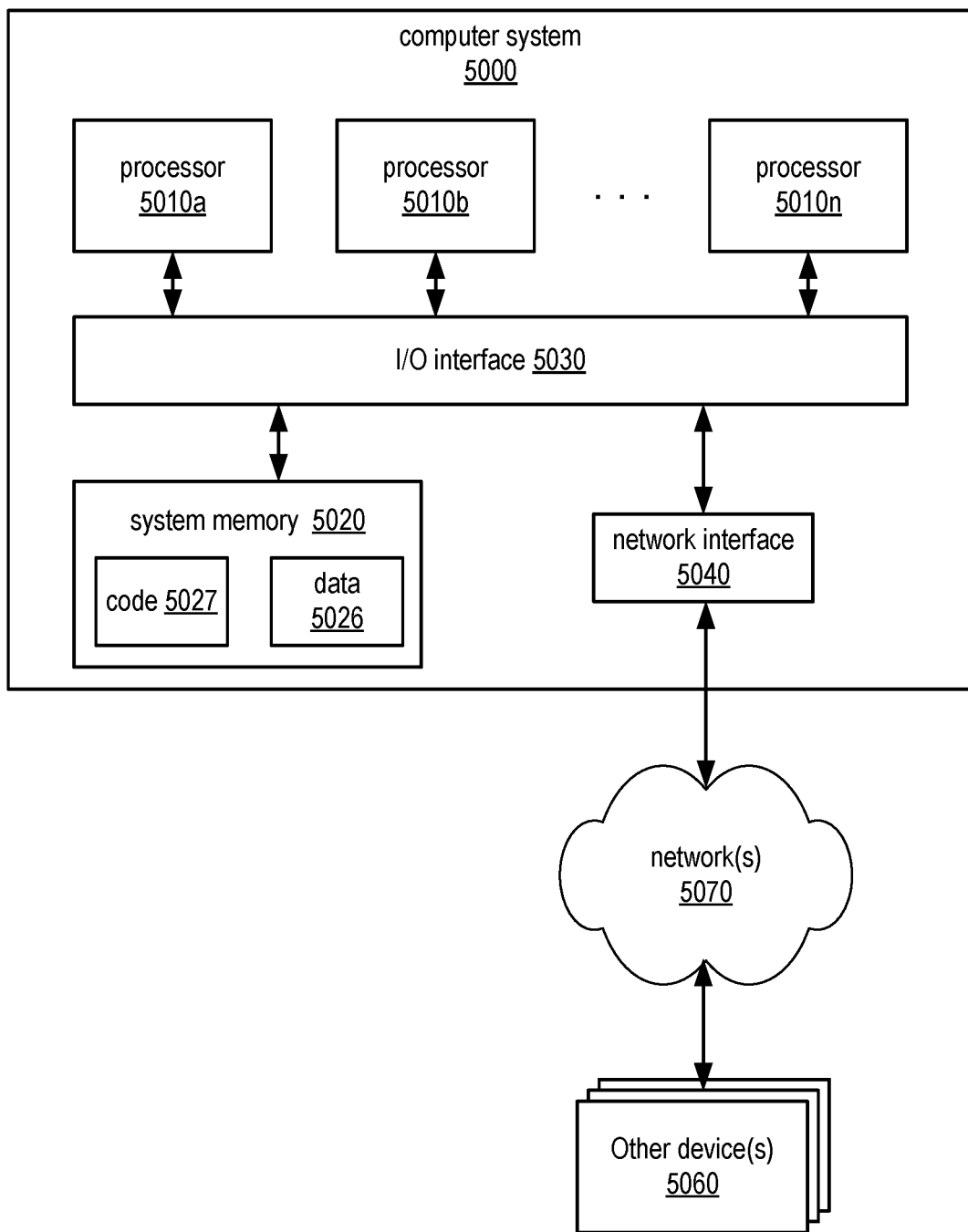
FIG. 17 is a block diagram illustrating an example computer system that may be used in some embodiments.

In some embodiments, a system that implements a portion or all of the methods and apparatus for providing flow policies for virtual networks in provider network environments as described herein may include a general-purpose computer system that includes or is configured to access one or more computer-accessible media, such as computer system 5000 illustrated in FIG. 17. In the illustrated embodiment, computer system 5000 includes one or more processors 5010 coupled to a system memory 5020 via an input/output (I/O) interface 5030. Computer system 5000 further includes a network interface 5040 coupled to I/O interface 5030.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 16, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 11 for implementing embodiments of methods and apparatus for providing flow policies for virtual networks in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A network device of a provider network, the network device comprising: one or more processors coupled to a memory, the memory including instructions to cause the one or more processors of the network device to:

receive packets on packet flows in the provider network, wherein the provider network is configured to provide a virtual networking service to a plurality of clients for implementing respective virtual networks on the provider network for the plurality of clients;

wherein the packet flows include packets to destination endpoints in a particular client's virtual network implemented on the provider network for the particular client of the plurality of clients of the virtual networking service or packets from source endpoints in the particular client's virtual network; and wherein the provider network includes network appliances at different addresses on the provider network configured to apply different packet processing functionalities to packets;

evaluate the packets according to flow policy rules for the particular client's virtual network as specified by the particular client to determine flow policy path information for the packets, wherein the flow policy path information determined for a given packet of the packets specifies a path comprising at least some of the network appliances at at least some of the different addresses on the provider network that are to process the given packet, wherein the flow policy rules specified by the particular client include logic for conditionally routing the packets on the packet flows through different paths on the provider network that include different ones of the network appliances at the different addresses on the provider network to apply different packet processing functionalities, as specified by the particular client in the flow policy rules, to the packets having respective source or destination endpoints within the particular client's virtual network on the provider network, based on information about the packets;

modify the packets to comprise the determined flow policy path information, wherein the determined flow policy path information of at least two of the packets specify different paths on the provider network that include different ones of the network appliances at the different addresses on the provider network to apply the different packet processing functionalities, as specified by the particular client in the flow policy rules, to the packets having respective source or destination endpoints within the particular client's virtual network on the provider network; and send the modified packets to one or more network appliances of the network appliances of the provider network on the respective paths specified by the determined flow policy path information of the respective modified packets.

2. The network device as recited in claim 1, wherein the instructions that upon execution cause the one or more processors to evaluate the received packets according to flow policy rules for the virtual network further comprise instructions that upon execution cause the network device to evaluate the packets according to information in packet headers of the packets, wherein the flow policy rules include logic for conditionally routing the packets on the packet flows to different network appliances on the provider network based on the information in the packet headers of the packets.

3. The network device as recited in claim 1, wherein the packets are received from another network device that implements a network appliance configured to process the packets and generate codes for the packets based on results of the processing, wherein the instructions that upon execution cause the one or more processors to evaluate the received packets according to flow policy rules for the virtual network further comprise instructions that upon execution cause the network device to evaluate the packets according to the codes for the packets, wherein the flow policy rules include logic for conditionally routing the packets on the packet flows to different network appliances on the provider network based on different values for the codes.

4. The network device as recited in claim 1, wherein the network appliances include one or more of network appliances within the virtual network configured to process packets on packet flows between endpoints within the virtual network or network appliances external to the virtual network configured to process packets on packet flows between endpoints in the virtual network and endpoints external to the virtual network.

5. The network device as recited in claim 1, wherein the flow policy rules are implemented according to a domain-specific language executable by a flow policy engine on the network device.

6. The network device as recited in claim 1, wherein the flow policy rules for the virtual network are specified by a client of the provider network via a flow policy service of the provider network.

7. A method, comprising:

performing, by a network device on a provider network:

receiving packets on packet flows in the provider network, wherein the provider network is configured to provide a virtual networking service to a plurality of clients for implementing respective virtual networks on the provider network for the plurality of clients;

wherein the packet flows include packets to destination virtual machines in a particular client's virtual network implemented on the provider network for the particular client of the plurality of clients of the virtual networking service, or packets from source virtual machines in the particular client's virtual network, wherein the provider network includes a plurality of other network devices at different addresses on the provider network configured to apply different packet processing functionalities to packets;

evaluating the packets according to flow policy rules for the particular client's virtual network as specified by the particular client to determine flow policy path information for the packets, wherein the flow policy path information determined for a given packet of the packets specifies a path comprising at least another network device of the plurality of other network devices on the provider network that is to process the given packet, wherein the flow policy rules specified by the particular client include logic for conditionally routing packets on packet flows to or from the virtual machines in the virtual network through different paths on the provider network that include different network devices of the plurality of other network devices on the provider network to apply different packet processing functionalities, as specified by the particular client in the flow policy rules, to the packets having respective source or destination endpoints within the particular client's virtual network on the provider network, based on information about the packets;

modifying the packets to comprise the determined flow policy path information, wherein the determined flow policy path information of at least two of the packets specify different paths on the provider network that include different network devices of the plurality of other network devices to apply the different packet processing functionalities, as specified by the particular client in the flow policy rules, to the packets having respective source or destination endpoints within the particular client's virtual network on the provider network; and sending the modified packets to one or more network devices of the plurality of other network devices of the provider network on the respective paths specified by the determined flow policy path information of the respective modified packets.

8. The method as recited in claim 7, wherein evaluating a packet according to the flow policy rules comprises evaluating the packet based at least in part on information in the packets as specified by the client in the flow policy rules.

9. The method as recited in claim 8, wherein the information in the packets includes information indicating source and destination endpoints of the packet, wherein the flow policy rules include logic for conditionally routing packets on packet flows to different network devices of the plurality of other network devices on the provider network based on different source or destination endpoints of the packets.

10. The method as recited in claim 9, wherein the codes include one or more of:
a code that indicates that a respective packet is to be sent to a network device that implements another network appliance for additional processing;
a code that indicates that a respective packet is to be sent to its destination endpoint;
a code that indicates that an out-of-band message is to be sent to a service; or
a code that indicates that a respective packet is to be dropped.

11. The method as recited in claim 9, wherein the provider network implements an overlay network, wherein the packets are encapsulated with overlay network metadata to generate overlay network packets for routing through the provider network, and wherein the codes are included in the overlay network metadata.

12. The method as recited in claim 11, wherein the network appliances include one or more of network appliances within the virtual network configured to process packets on packet flows between endpoints within the virtual network or network appliances external to the virtual network configured to process packets on packet flows between endpoints in the virtual network and endpoints external to the virtual network.

13. The method as recited in claim 11, wherein the determined network devices further include one or more of devices that implement edge routers of the provider network, devices that implement gateways of the virtual network, or devices that implement the virtual machines in the virtual network.

14. The method as recited in claim 7, wherein the packets are received from another network device that implements a network appliance configured to process the packets and generate codes for the packets based on results of the processing, wherein evaluating a packet according to the flow policy rules comprises evaluating the packet according to the code for the packet, wherein the flow policy rules include logic for conditionally routing the packets on the packet flows to different network devices of the plurality of other network devices on the provider network based on different codes.

15. The method as recited in claim 7, wherein the determined network devices include one or more devices that implement one or more network appliances configured to process packets on packet flows to or from the virtual machines in the virtual network, wherein the network appliances include one or more of firewalls, intrusion detection systems, virus scanning systems, traffic analysis systems, load balancers, network accelerators, encryption systems, or packet filtering systems.

16. The method as recited in claim 7, further comprising:
receiving processed packets with return codes from one of the determined network devices;
evaluating each processed packet according to the flow policy rules based on the return code for the processed packet to determine a next network device to receive the processed packet, wherein the flow policy rules include logic for conditionally routing the processed packets to different network devices of the plurality of other network devices on the provider network based on different return codes; and
sending the processed packets to the determined next network devices, wherein at least two of the packets are sent to different network devices.

17. One or more non-transitory computer-readable storage media storing program instructions that when executed on or across one or more processors of a network device of a provider network cause the one or more processors to:
receive packets on a packet flow in the provider network, wherein the provider network is configured to provide a virtual networking service to a plurality of clients for implementing respective virtual networks on the provider network for the plurality of clients;
wherein the packet flow includes packets to destination virtual machines in a particular client's virtual network implemented on a provider network for the particular client of the plurality of clients of the virtual networking service, or packets from source virtual machines in the particular client's virtual network;
wherein the provider network includes network appliances at different network addresses of the provider network configured to apply different packet processing functionalities to packets;
evaluate the packets according to flow policy rules for the particular client's virtual network as specified by the particular client to determine a network appliance of the network appliances on the provider network to process the packets on the packet flow, wherein the flow policy rules include logic for conditionally routing the packets on the packet flows through different paths on the provider network that include a different one or more of the network appliances at one or more of the different network addresses on the provider network to apply one or more different packet processing functionalities to the packets having respective source or destination virtual machines within the particular client's virtual network on the provider network, based on information about the packet;
send the packets to the network appliance on the provider network for processing;
receive the processed packets from the network appliance with return codes of the network appliance;
evaluate each processed packet according to the flow policy rules for the particular client's virtual network as specified by the particular client based on the return code of the network appliance for the processed packet to determine a network device to receive the processed packet, wherein the flow policy rules specified by the particular client include logic for conditionally routing the processed packets to different network devices on the provider network based on different return codes of the network appliance; and send the processed packets to the determined network devices, wherein at least two of the packets are sent to different network devices.

18. The one or more non-transitory computer-readable storage media as recited in claim 17, wherein the return codes of the network appliance include one or more of:

a code that indicates that a respective packet is to be sent to a network device that implements another network appliance for additional processing;

a code that indicates that a respective packet is to be sent to its destination endpoint;

a code that indicates that an out-of-band message is to be sent to a service; or a code that indicates that a respective packet is to be dropped.

19. The one or more non-transitory computer-readable storage media as recited in claim 17, wherein the determined network devices include at least one device that implements another network appliance configured to further process packets on packet flows to or from the virtual machines in the virtual network.

20. The one or more non-transitory computer-readable storage media as recited in claim 19, wherein the network appliances include one or more of network appliances within the virtual network configured to process packets on packet flows between endpoints within the virtual network or network appliances external to the virtual network configured to process packets on packet flows between endpoints in the virtual network and endpoints external to the virtual network.

* * * * *